United States Patent
Steffler et al.

(10) Patent No.: US 9,180,415 B2
(45) Date of Patent: *Nov. 10, 2015

(54) MIXER NOZZLE ASSEMBLY

(71) Applicants: Mixer Technologies Inc., Guelph (CA); Donna Savard, Edmonton (CA)

(72) Inventors: Shawn P. Steffler, Fergus (CA); Donald D. Savard, Edmonton (CA)

(73) Assignee: Mixer Technologies Inc., Corunna, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/250,979

(22) Filed: Apr. 11, 2014

(65) Prior Publication Data

US 2014/0233345 A1    Aug. 21, 2014

Related U.S. Application Data

(63) Continuation of application No. 13/208,879, filed on Aug. 12, 2011, now Pat. No. 8,734,004.

(60) Provisional application No. 61/373,469, filed on Aug. 13, 2010.

(51) Int. Cl.
*B01F 5/04* (2006.01)
*B01F 5/02* (2006.01)
(Continued)

(52) U.S. Cl.
CPC ............. *B01F 5/0218* (2013.01); *B01F 5/0231* (2013.01); *B01F 15/00201* (2013.01); *B01F 15/00376* (2013.01); *G01P 3/02* (2013.01); *G01P 3/12* (2013.01)

(58) Field of Classification Search
CPC .. B01F 7/00758; B01F 5/0218; B01F 5/0231; B01F 15/00201; B01F 15/00376

USPC ........ 366/181.4, 137, 167.2, 263, 263.3, 142, 366/168.1, 168.2, 169.1, 170.2, 170.3, 194, 366/196

See application file for complete search history.

(56) References Cited

U.S. PATENT DOCUMENTS

| | | | |
|---|---|---|---|
| 1,435,140 | A | 11/1922 | Rolland |
| 2,108,787 | A | 2/1938 | Coles et al. |

(Continued)

FOREIGN PATENT DOCUMENTS

| | | |
|---|---|---|
| CA | 2298920 | 1/2007 |
| DE | 732907 | 3/1943 |

(Continued)

OTHER PUBLICATIONS

English Translation of Abstract of Japanese Utility Model Application No. Sho 57-041047 (Japanese Utility Model Application Laid-open No. Sho 57-173828) published on Nov. 2, 1982.

(Continued)

*Primary Examiner* — Tony G Soohoo
*Assistant Examiner* — Anshu Bhatia

(57) ABSTRACT

A mixer nozzle assembly for mixing fluid introduced into a tank having a tank volume therein. The mixer nozzle assembly includes a stationary body and a rotatable body mounted on the stationary body for rotation about an axis in a predetermined direction. The fluid flows through the stationary body to the rotatable body and exits into the tank volume via one or more outlet apertures, thereby causing the rotatable body to rotate in the predetermined direction about the axis. The mixer nozzle assembly also includes a governor subassembly for controlling a speed of rotation of the rotatable body in the predetermined direction about the axis and a hydraulic circuit for governing a flow rate of hydraulic fluid directed to the governor subassembly, to adjust the flow rate of the hydraulic fluid for adjusting the speed of rotation of the rotatable body to the preselected speed.

16 Claims, 20 Drawing Sheets

(51) Int. Cl.
  B01F 15/00 (2006.01)
  G01P 3/02 (2006.01)
  G01P 3/12 (2006.01)

(56) References Cited

U.S. PATENT DOCUMENTS

| | | | |
|---|---|---|---|
| 2,592,904 A | | 4/1952 | Jackson |
| 2,784,034 A | | 3/1957 | Metcalf |
| 3,326,468 A | | 6/1967 | Bristow et al. |
| 3,556,407 A | | 1/1971 | Niikura et al. |
| 3,623,665 A | | 11/1971 | Sugino |
| 3,885,740 A | | 5/1975 | Sugino et al. |
| 3,922,605 A | | 11/1975 | Sarrell |
| 4,056,227 A | | 11/1977 | Fismen |
| 5,098,666 A | * | 3/1992 | Meinz ............ 366/19 |
| 5,269,604 A | * | 12/1993 | Ewers ............ 366/277 |
| 5,333,630 A | | 8/1994 | Jepsen et al. |
| 5,899,560 A | * | 5/1999 | Byers ............ 366/137 |
| 6,371,137 B1 | | 4/2002 | Heath |
| 6,488,402 B1 | * | 12/2002 | King et al. ............ 366/173.2 |
| 8,734,004 B2 | | 5/2014 | Steffler et al. |
| 2010/0282867 A1 | | 11/2010 | Savard |

FOREIGN PATENT DOCUMENTS

| | | |
|---|---|---|
| JP | 57-173828 | 11/1982 |
| JP | 63-252595 | 10/1988 |
| JP | 02-095538 | 7/1990 |
| JP | 63-054426 | 4/1998 |
| JP | 2003-193507 | 7/2003 |
| JP | 2006-142151 | 6/2006 |
| WO | WO97/27951 | 8/1997 |
| WO | WO2009/094748 | 8/2009 |

OTHER PUBLICATIONS

English Translation of Abstract of Japanese Utility Model Application No. Hei 01-001148 (Japanese Utility Model Application Laid-open No. Hei 02-095538) published on Jul. 30, 1990.
English Translation of Abstract of Japanese Utility Model Application No. Sho 61-146422 (Japanese Utility Model Application Laid-open No. Sho 63-054426) published on Apr. 12, 1988.
Machine Generated English Translation of Japanese Patent Application Laid-open No. 2003-193507, published on Jul. 9, 2003.
Machine Generated English Translation of Japanese Patent Application Laid-open No. 2006-142151, published on Jun. 8, 2006.
English Translation of Abstract of Japanese Patent Application Laid-open No. Sho 63-252595, published on Oct. 19, 1988.

* cited by examiner

MIXER NOZZLE ASSEMBLY

This is a continuation of co-pending application Ser. No. 13/208,879, filed on Aug. 12, 2011, and claims the benefit of U.S. Provisional Application No. 61/373,469, filed on Aug. 13, 2010, each of which prior application is incorporated herein in its entirety by reference.

FIELD OF THE INVENTION

This invention is related to a mixer nozzle assembly for mixing fluid introduced into a tank.

BACKGROUND OF THE INVENTION

As is well known in the art, various problems can arise in connection with the storage of various fluids, for example, when a new batch of fluid is introduced into a storage tank holding a previously-introduced batch of fluid. The fluid may be, for instance, crude oil, or other petroleum products.

There may be a need for mixing due to differences between different batches of the same fluid, e.g., differences in composition. When a new volume of fluid is introduced into a tank which already holds a quantity of the fluid, the newly-introduced fluid and the fluid already in the tank may not mix together well, especially if the tank is large. Therefore, it may be important to mix the newly-introduced fluid with the previously-introduced fluid, to achieve homogeneity (or near-homogeneity) of all the fluid in the tank, to an extent. For example, if the fluid is crude oil, there may be differences in the crude oil because of different sources thereof, and it is desirable to mix the crude oil to achieve a degree of homogeneity in the crude oil in the tank.

Typically (although not necessarily), the storage tank has a generally cylindrical footprint. The tank may be relatively small (e.g., as small as about 12 feet (3.6 m.) in diameter) or relatively large (e.g., over 200 (61 m.) or even over 300 (91.4 m.) feet in diameter), and may have a capacity of up to several millions of liters.

Various devices for mixing fluid in storage tanks are known. In general, the conventional mixing devices agitate the fluid, i.e., they introduce additional turbulence into the fluid. In general, in large storage tanks, achieving the desired degree of mixing throughout the fluid in the tank is difficult with a conventional mixer. The problem is compounded by variations in viscosity and other characteristics of the fluid flowing into the tank, as well as variations in the rate of flow of the fluid into the tank. The problem is further compounded by the somewhat difficult environment in which the mixing devices operate, i.e., they typically operate at least partially inside the tank, however, the interior of the tank (and the part of the conventional mixing device positioned therein) is not usually accessible during the operating life of the tank.

SUMMARY OF THE INVENTION

For the foregoing reasons, there is a need for a nozzle mixer assembly which overcomes or mitigates one or more of the shortcomings of the prior art.

In its broad aspect, the invention provides a mixer nozzle assembly for mixing fluid introduced into a tank having a tank volume therein. The mixer nozzle assembly includes a stationary body having one or more inlets and one or more outlets in fluid communication with each other, and a rotatable body mounted on the stationary body for rotation relative to the stationary body about an axis in a predetermined direction when the fluid flows through the rotatable body. The rotatable body includes one or more intake apertures and one or more outlet apertures in fluid communication with each other, the intake aperture being in fluid communication with the outlet of the stationary body for permitting the fluid to flow from the inlet of the stationary body to the outlet aperture, to exit therefrom into the tank volume. Each outlet aperture is formed to direct the fluid exiting the rotatable body therethrough in a direction that is non-aligned with the axis, for causing the rotatable body to rotate in the predetermined direction about the axis. The fluid exiting the outlet apertures mixes with at least a part of the fluid in the tank volume. The mixer nozzle assembly also includes a governor subassembly for controlling a speed of rotation of the rotatable body in the predetermined direction about the axis. The governor subassembly includes a driveshaft secured to the rotatable body for rotation with the rotatable body about the axis at the speed of rotation, one or more internal elements attached to the driveshaft, for rotation with the driveshaft about the axis at the speed of rotation, and a governor body defining one or more cavities therein in which the internal element is receivable to at least partially define an internal volume between the internal element and the governor body. The internal volume is adapted to receive hydraulic fluid directable therethrough at a preselected flow rate to moderate rotation of the internal element about the axis, for causing the rotatable body to rotate at a preselected speed. Also, the mixer nozzle assembly includes a hydraulic circuit for governing a flow rate of the hydraulic fluid, to adjust the flow rate to the preselected flow rate, for adjusting the speed of rotation of the rotatable body to the preselected speed.

In another of its aspects, the mixer nozzle assembly additionally includes a speed indicator, for indicating the speed of rotation of the rotatable body about the axis. In addition, the hydraulic circuit also includes a valve for controlling the flow rate of the hydraulic fluid to the internal volume, to provide the hydraulic fluid thereto at the preselected flow rate, and a hydraulic pump for additionally controlling the flow rate of the hydraulic fluid to the internal volume, to provide the hydraulic fluid thereto at the preselected flow rate. Accordingly, the flow rate is adjustable by the valve and by the hydraulic pump to the preselected flow rate, to adjust the speed of rotation of the rotatable body about the axis to the preselected speed.

In another of its aspects, the invention provides a method of mixing the fluid introduced into the tank including the step of, with a speed indicator, determining the speed of rotation of the rotatable body about the axis relative to the stationary body.

In another of its aspects, the method additionally includes the step of, based on the speed of rotation of the rotatable body as indicated by the speed indicator, controlling the flow rate of the hydraulic fluid to the internal volume with a valve, to adjust the flow rate to the preselected flow rate, for adjusting the speed of rotation of the rotatable body to the preselected speed.

In yet another of its aspects, the method additionally includes the step of, based on the speed of rotation of the rotatable body as indicated by the speed indicator, controlling the flow rate of the hydraulic fluid to the internal volume with a hydraulic pump, to adjust the flow rate to the preselected flow rate, for adjusting the speed of rotation of the rotatable body to the preselected speed.

In another of its aspects, the invention provides a tank for storing fluid therein, including one or more tank walls, the tank wall(s) at least partially defining a tank volume in which the fluid is receivable, and a mixer nozzle assembly. The mixer nozzle assembly includes a stationary body having one or more inlets and one or more outlets in fluid communication with each other, and a rotatable body mounted on the stationary body for rotation relative to the stationary body about an axis in a predetermined direction when the fluid flows through the rotatable body. The rotatable body includes one or more intake apertures and one or more outlet apertures thereof in fluid communication with each other, the intake aperture being in fluid communication with the outlet of the stationary body for permitting the fluid to flow from the inlet of the stationary body to the outlet aperture(s), to exit therefrom into the tank volume. The outlet aperture(s) are formed to direct the fluid exiting the rotatable body therethrough in a direction that is non-aligned with the axis, for causing the rotatable body to rotate in the predetermined direction about the axis. The fluid exiting the outlet aperture(s) mixes with at least a part of the fluid in the tank volume. The mixer nozzle assembly also includes a governor subassembly for controlling a speed of rotation of the rotatable body in the predetermined direction about the axis. The governor subassembly includes a driveshaft secured to the rotatable body for rotation with the rotatable body about the axis at the speed of rotation, one or more internal elements attached to the driveshaft, for rotation with the driveshaft about the axis at the speed of rotation, and a governor body defining one or more cavities therein in which the internal element is receivable to at least partially define an internal volume between the internal element and the body. The internal volume is adapted to receive hydraulic fluid directable therethrough at a preselected flow rate to moderate rotation of said at least one internal element about the axis, for causing the rotatable body to rotate at a preselected speed. In addition, the mixer nozzle assembly includes a hydraulic circuit for governing a flow rate of the hydraulic fluid, to adjust the flow rate to the preselected flow rate, for adjusting the speed of rotation of the rotatable body to the preselected speed.

BRIEF DESCRIPTION OF THE DRAWINGS

The invention will be better understood with reference to the attached drawings, in which.

DETAILED DESCRIPTION

Figure 4:
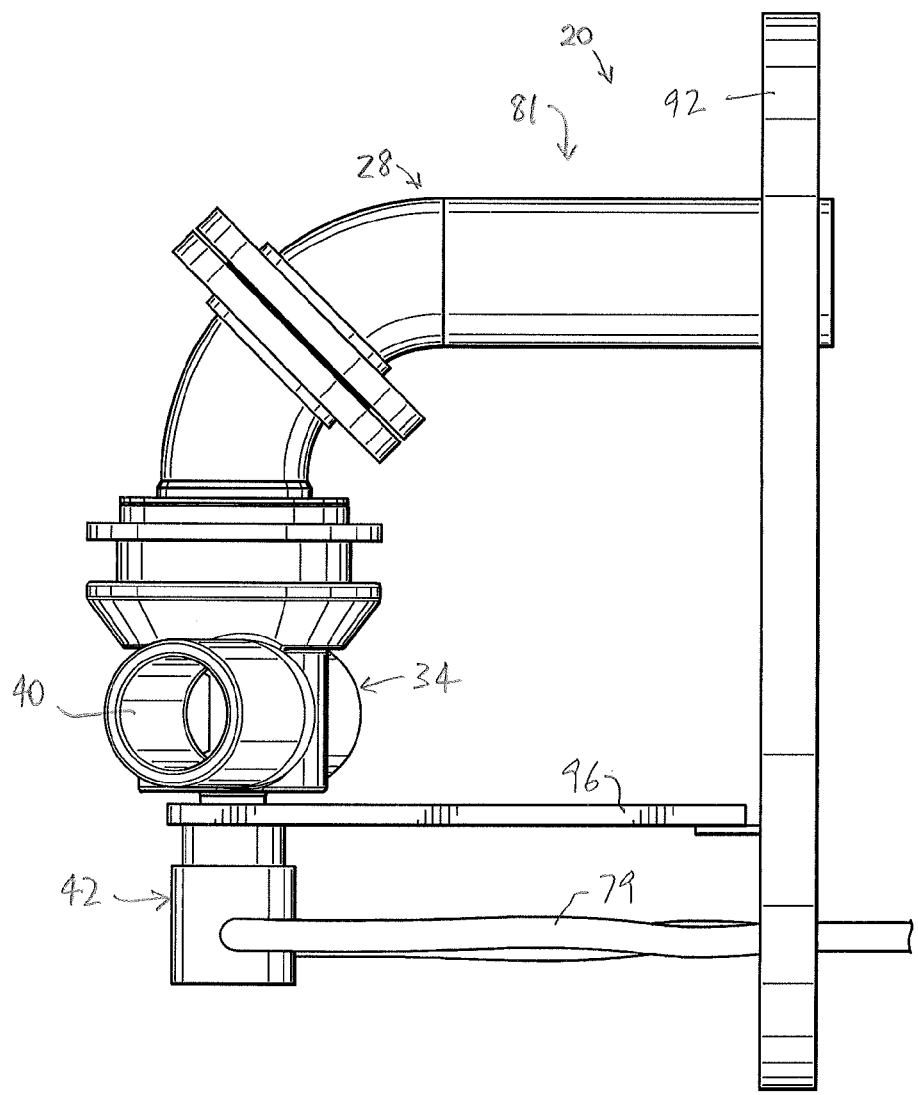
FIG. 4 is a side view of the mixer nozzle assembly of FIG. 1A.
Figure 5A:
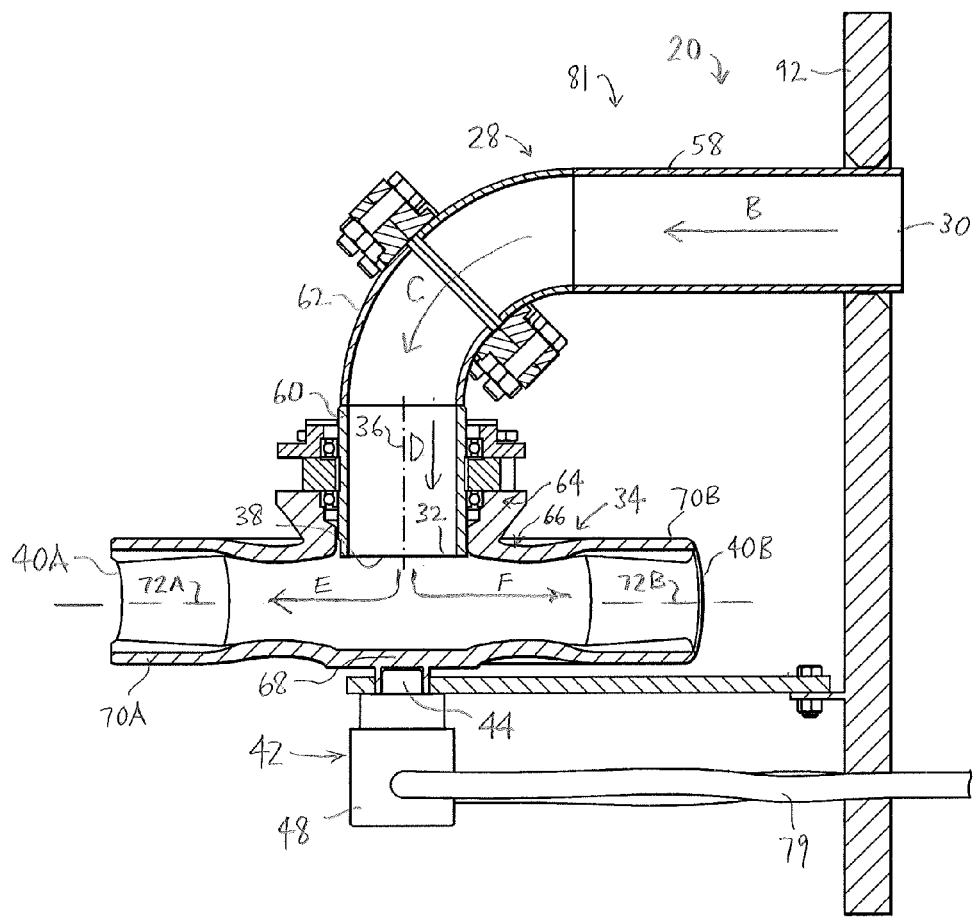
FIG. 5A is a cross-section of the mixer nozzle assembly of FIG. 1A.

In the attached drawings, like reference numerals designate corresponding elements throughout. Reference is first made to FIGS. 1A-1C, 2A, 3-5A, and 5C to describe an embodiment of a mixer nozzle assembly of the invention referred to generally by the numeral 20. As can be seen in FIG. 1B, the mixer nozzle assembly 20 is for mixing fluid 22 introduced into a tank 24 having a tank volume 26 therein. In one embodiment, the mixer nozzle assembly 20 preferably includes a stationary body 28 with one or more inlets 30 and one or more outlets 32 in fluid communication with each other (FIG. 5A), a rotatable body 34 mounted on the stationary body 28 for rotation about an axis 36 in a predetermined direction indicated by arrow "A" in FIG. 1C. Preferably, the rotatable body 34 includes one or more intake apertures 38 and one or more outlet apertures 40 in fluid communication with each other. Also, the intake aperture 38 is in fluid communication with the outlet 32 of the stationary body 28 for permitting the fluid 22 to flow from the inlet 30 of the stationary body 28 to the outlet aperture(s) 40, to exit therefrom into the tank volume 26. Preferably, and as will be described, each outlet aperture 40 is formed to direct the fluid 22 exiting the rotatable body 34 therethrough in a direction that is non-aligned with the axis 36, for causing the rotatable body 34 to rotate in the predetermined direction about the axis of rotation 36, the fluid exiting said at least one outlet aperture mixing with at least a part of the fluid in the tank volume 26. It is also preferred that the mixer nozzle assembly 20 includes a governor subassembly 42 for controlling a speed of rotation of the rotatable body 34 in the predetermined direction about the axis 36. In one embodiment, the governor subassembly 42 preferably includes a driveshaft 44 (FIGS. 5A, 5C) secured to the rotatable body 34 for rotation with the rotatable body 34 about the axis 36 at the speed of rotation, and one or more internal elements 46 attached to the driveshaft 44, for rotation with the driveshaft 44 about the axis 36 at the speed of rotation. Preferably, the governor subassembly 42 also includes a governor body 48 defining one or more cavities 50 therein in which the internal element 46 is receivable to at least partially define an internal volume 52 between the internal element 46 and the body 48 (FIG. 5C). As will also be described, the internal volume 52 is adapted to receive hydraulic fluid (not shown) directed therethrough at a preselected flow rate to moderate rotation of the internal element 46 about the axis 36, for causing the rotatable body 34 to rotate at a preselected speed. It is also preferred that the governor subassembly 42 includes a hydraulic circuit 54 (FIGS. 1A, 2A, 2C) for governing a flow rate of the hydraulic fluid, to adjust the flow rate to the preselected flow rate, for adjusting the speed of rotation of the rotatable body 34 to the preselected speed.

It will be understood that certain elements of the mixer nozzle assembly are omitted from certain views for clarity of illustration. For instance, most or all of the part of the hydraulic circuit that is positioned outside the tank is omitted from FIGS. 1A, 1C and 3-5A.

Figure 1A:
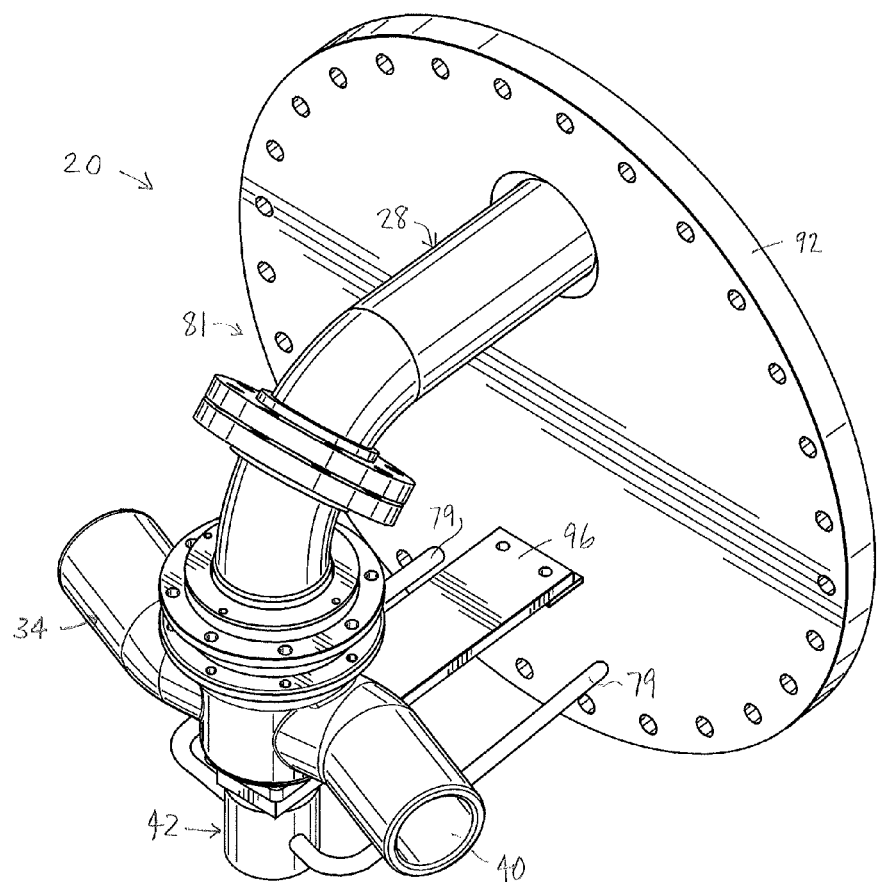
FIG. 1A is an isometric view of an embodiment of a mixer nozzle assembly of the invention.
Figure 1B:
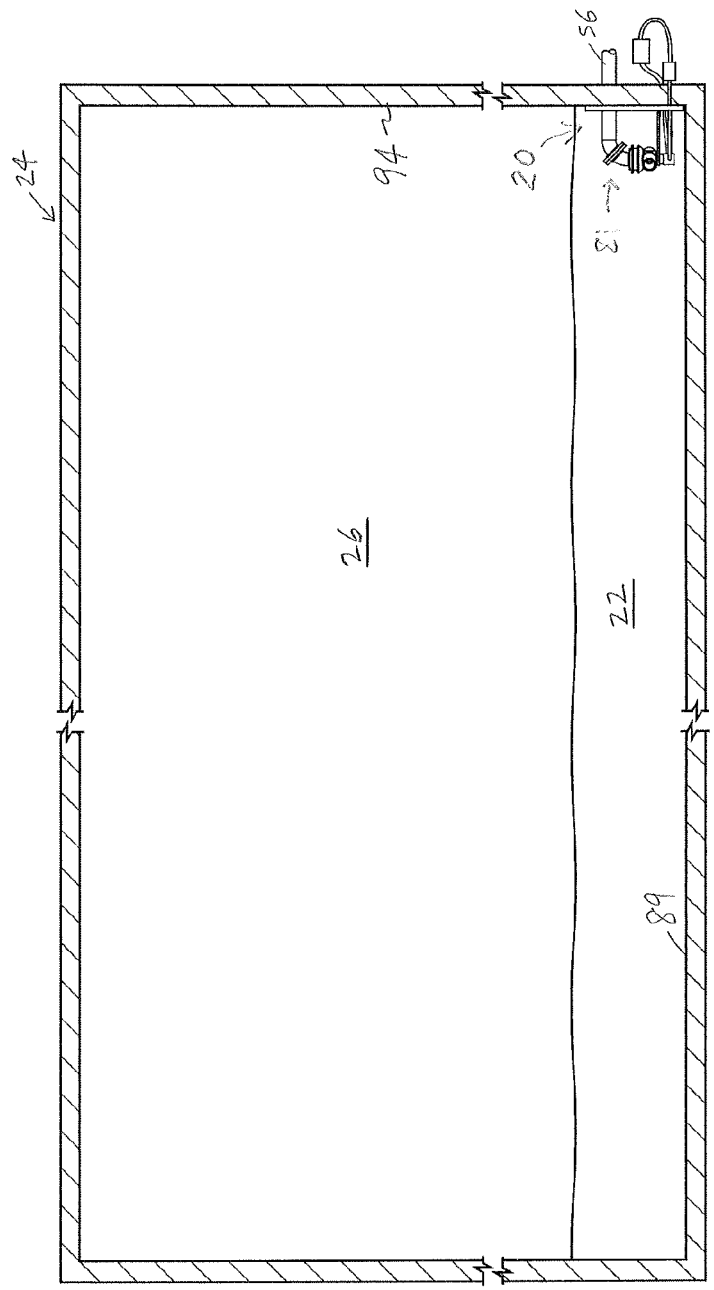
FIG. 1B is a cross-section of a storage tank with elements of the mixer nozzle assembly of FIG. 1A mounted therein, drawn at a smaller scale.
Figure 1C:
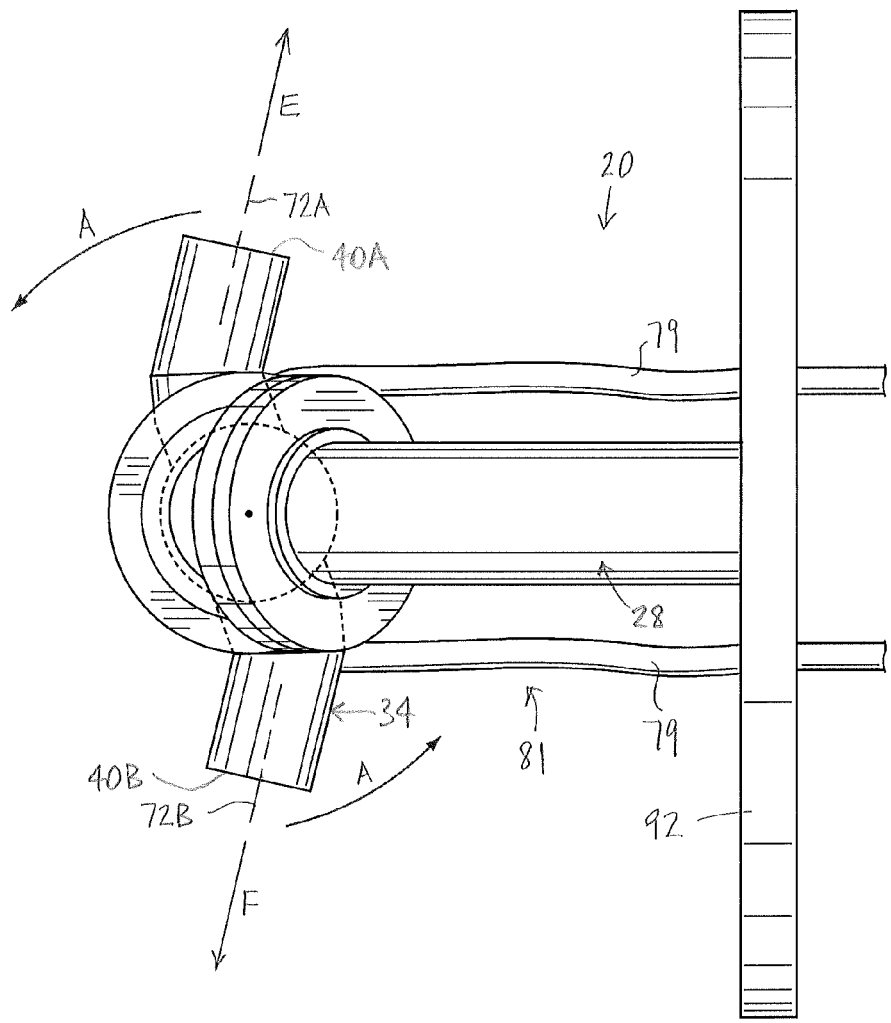
FIG. 1C is a top view of the mixer nozzle assembly of FIG. 1A, drawn at a larger scale.

As can be seen in FIGS. 1A and 1C, the fluid 22 is directed into the stationary body 28 from an external pipe 56 (FIGS. 2A, 2B) positioned outside the tank 24. In one embodiment, the stationary body 28 preferably includes first and second portions 58, 60, and an intermediate portion 62 positioned therebetween (FIGS. 4, 5A). It is preferred that, once mounted in the tank 24, the first portion 58 is positioned substantially horizontal, and the second portion 60 is positioned substantially vertical. The intermediate portion 62 preferably is in the form of an elbow, as is known in the art, to change the direction of flow of the fluid 22 from the substantially horizontal to the substantially vertical (i.e., downward). As can be seen in FIGS. 4 and 5A, the fluid 22 flows inwardly from the external pipe through the first portion 58 (as schematically represented by arrow "B"), through the intermediate portion 62 (as schematically represented by arrow "C", and downwardly through the second portion 60 (as schematically represented by arrow "D").

It is also preferred that the rotatable body 34 includes two outlet apertures, designated 40A and 40B in FIG. 5A for clarity. As shown in FIG. 5A, the rotatable body 34 preferably includes a mounting portion 64 which is mounted on the second portion 60 of the stationary body 28 for rotation about the axis of rotation 36, and a main portion 66 including the intake aperture 38 and the outlet apertures 40A, 40B. A central part 68 of the main portion 66 is aligned with the axis of rotation 36. The fluid 22 flowing through the second portion 60 (as indicated by arrow "D") enters the rotatable body via the intake aperture 38 and, upon engaging the central part 68, splits into two substantially equivalent streams flowing toward and through the outlet apertures 40A, 40B, as schematically represented by arrows "E" and "F" (FIG. 5A). As can be seen in FIG. 1C, the main portion 66 is formed so that it includes end parts 70A, 70B which preferably are coaxial with outlet axes 72A, 72B respectively, and the outlet axes 72A, 72B are offset relative to the axis of rotation 36. The outlet axes 72A, 72B are also offset relative to each other (FIGS. 1C, 5A).

From FIGS. 1C and 5A, it can be seen that the nozzle assembly 20 creates jets of fluid exiting the outlet apertures 40A, 40B which, pushing against fluid 22 already in the tank 24, cause the rotatable body 24 to rotated in the predetermined direction, indicated by arrow "A" in FIG. 1C. The jets of fluid that exit the outlet apertures 40A, 40B are generally coaxial with the respective axes 72A, 72B. The fluid 22 exiting the outlet apertures 40A, 40B thus is mixed with the fluid 22 already in the tank volume 26, and also causes further mixing of the fluid 22 already in the tank volume 26. It will be understood that a number of elements are omitted from the drawings for clarity. For instance, it will be understood that the mixer nozzle assembly 20 illustrated in FIG. 1C is intended to be mounted on the tank so that the rotatable body 34 is positioned proximal to a tank wall and the stationary and rotatable bodies are at least partially immersed in the fluid, and that fluid jets exiting from the outlet apertures mix with the fluid already in the tank.

As can be seen in FIG. 5A, the driveshaft 44 is directly mounted to the rotatable body 34, so that rotation of the rotatable body 34 in the predetermined direction results in directly corresponding rotation of the driveshaft 44, also in the predetermined direction. In particular, the driveshaft 44 is mounted to an external side of the central part 68 so that the driveshaft 44 is coaxial with the axis of rotation 36, about which the rotatable body 34 rotates.

In one embodiment, the governor subassembly 42 is any suitable hydraulic motor. Those skilled in the art would be aware of various types of hydraulic motors. As an example, an external gear motor is illustrated in FIG. 5C. In this motor, the internal element 46 includes a driving gear 74. As can be seen in FIG. 5C, the driving gear 74 is directly secured to the driveshaft 44, so that rotation of the driving gear 74 directly corresponds to rotation of the driveshaft 44. As noted above, the driveshaft 44 rotates with the rotatable body 34. This means that rotation of the driving gear 74 also directly corresponds to rotation of the rotatable body 34. As can be seen in FIG. 5C, the driving gear 74 partially defines the internal volume 52.

In this example, however, because the governor subassembly 42 is an external gear motor, it also includes an idler gear 76 for cooperation with the driving gear 74. Both the driving gear 74 and the idler gear 76 are mounted in the cavity 50 inside the governor body 48, to partially define the internal volume 52. The driving gear 74 rotates with the driveshaft 44 in the direction indicated by arrow "A" (i.e., in the same direction as the rotatable body 34), and the idler gear 76 rotates in the direction indicated by arrow "G". In operation, hydraulic fluid (not shown) flows into the governor body 48 (as schematically represented by arrow "H"), and then through the internal volume (as schematically represented by arrows "$J_1$" to "$J_{11}$"), and exits the governor body, as schematically represented by arrow "K". It will be appreciated by those skilled in the art that, as the governor subassembly 42 preferably is a hydraulic motor in which the driveshaft 44 is driven by the rotatable body's rotation, the rate at which the hydraulic fluid flows into the internal volume (i.e., as indicated by arrows "H" and "$J_1$ to "$J_{11}$") affects the speed at which the driving gear 74 rotates.

The preselected flow rate of the hydraulic fluid is the flow rate that results in the rotatable body rotating at the preselected speed, i.e., in the conditions to which the rotating body is subjected at that time. Decreasing the flow rate into the internal volume 52 tends to retard the speed of rotation of the driving gear 74, which also tends to decrease the speed of rotation of the driveshaft 44 and the speed of rotation of the rotatable body 24 accordingly. Increasing the flow rate into the internal volume 52 tends to cause the speed of rotation of the driving gear to increase. In this way, adjustment of the rate at which the hydraulic fluid flows into the internal volume 52 results in adjustment of the speed of rotation of the rotatable body 34. However, it should be kept in mind that, in practice, because of changes in the other factors which may affect the speed of rotation of the rotatable body (e.g., the rate of flow of the fluid through the rotatable body 34), variations in the flow rate of the hydraulic fluid may not result in a directly corresponding change in the speed of rotation of the rotatable body 34. Because of this, a means for determining the speed of rotation (described below) is preferably included in the mixer nozzle assembly 20, to enable an operator (not shown) to make appropriate adjustments to the hydraulic fluid flow rate that will take all the variable factors into account, i.e., to adjust the flow rate of the hydraulic fluid to the preselected flow rate therefor, so as to adjust the speed of rotation of the rotatable body to the preselected speed.

Figure 2A:
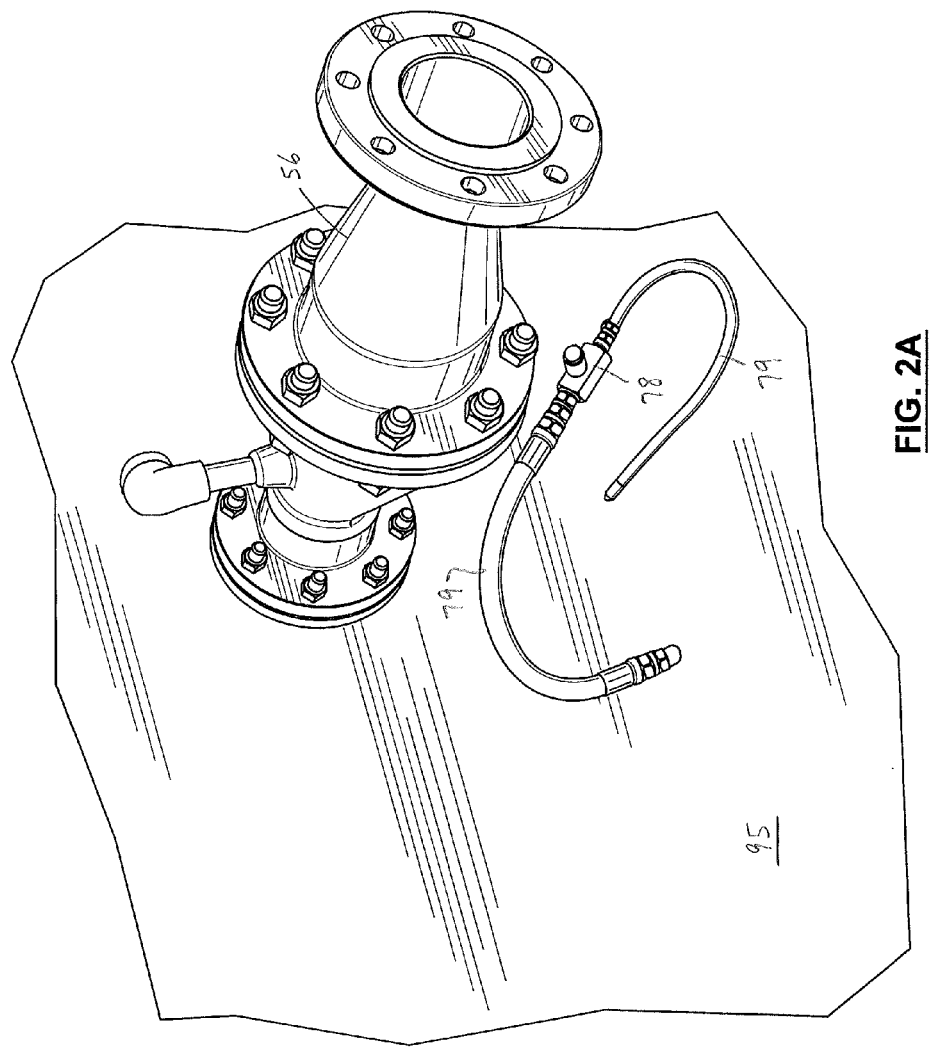
FIG. 2A is an isometric view of certain elements of the mixer nozzle assembly of FIG. 1A positioned outside the tank of FIG. 1B.
Figure 2B:
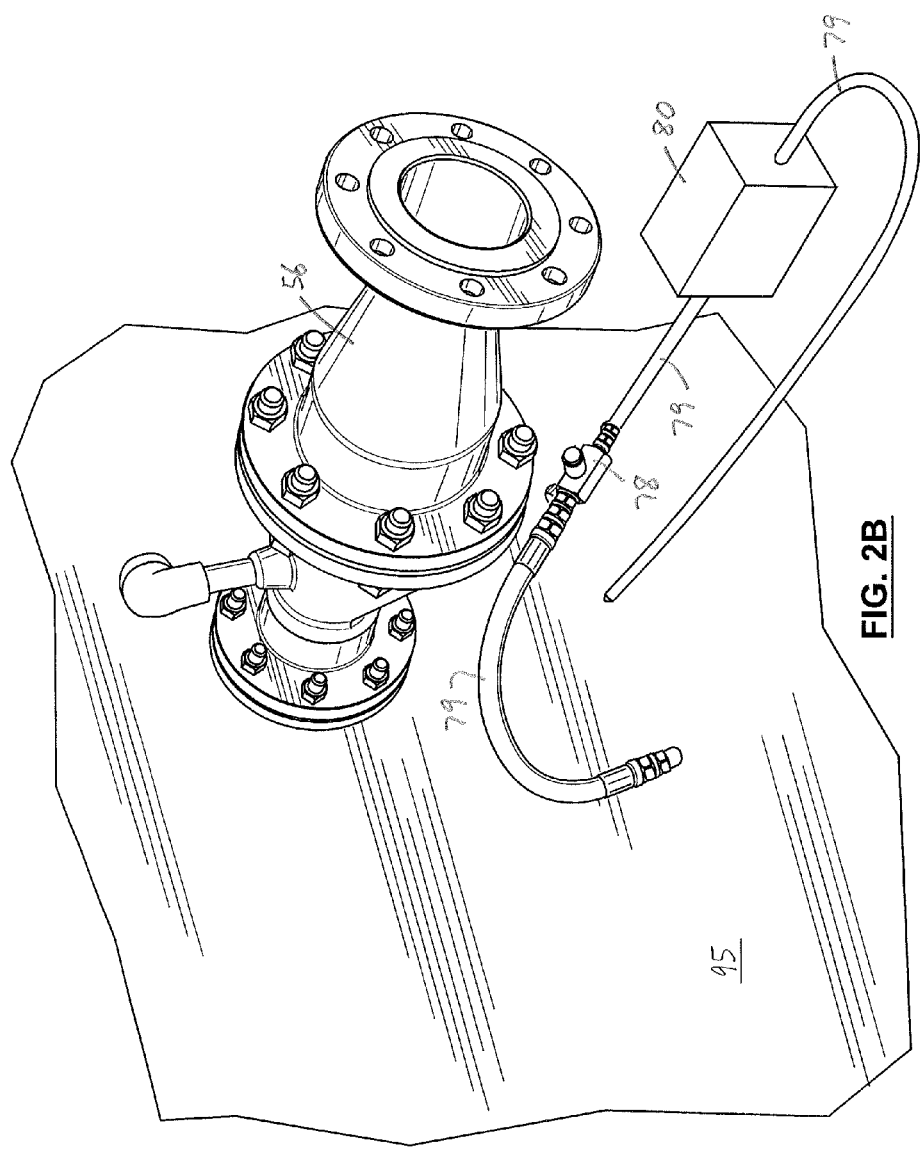
FIG. 2B is an isometric view of an alternative embodiment of certain elements of the mixer nozzle assembly of the invention positioned outside the tank.
Figure 2C:
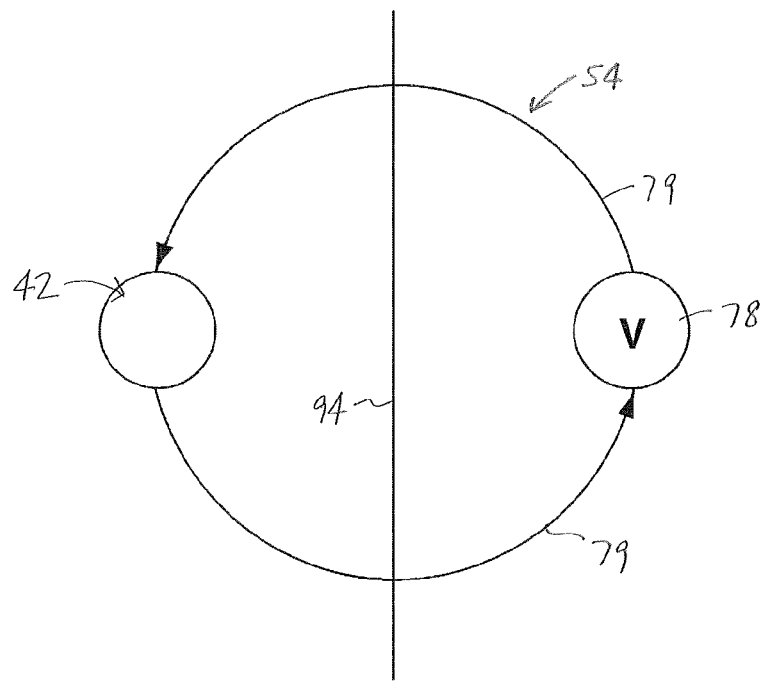
FIG. 2C is a block diagram schematically representing a governor subassembly and a hydraulic circuit in the embodiment of the mixer nozzle assembly of the invention partially illustrated in FIG. 2A.

In one embodiment, the hydraulic circuit 54 preferably also includes a valve 78 for controlling the flow of the hydraulic fluid to the internal volume 52, to adjust the speed of rotation of the rotatable body 34 to the preselected speed. As can be seen in FIGS. 2A and 2C, it is preferred that the valve 78 is located outside the tank 24, for adjustment of the flow rate of the hydraulic fluid. The valve 78 preferably is any suitable valve, as would be known to those skilled in the art. For instance, a needle valve has been found to be suitable. As can be seen, for instance, in FIGS. 1A and 2A, and as schematically illustrated in FIG. 2C, the hydraulic fluid travels through tubes or lines 79 attached to the governor body 48 and to the valve 78 for that purpose.

Figure 2D:
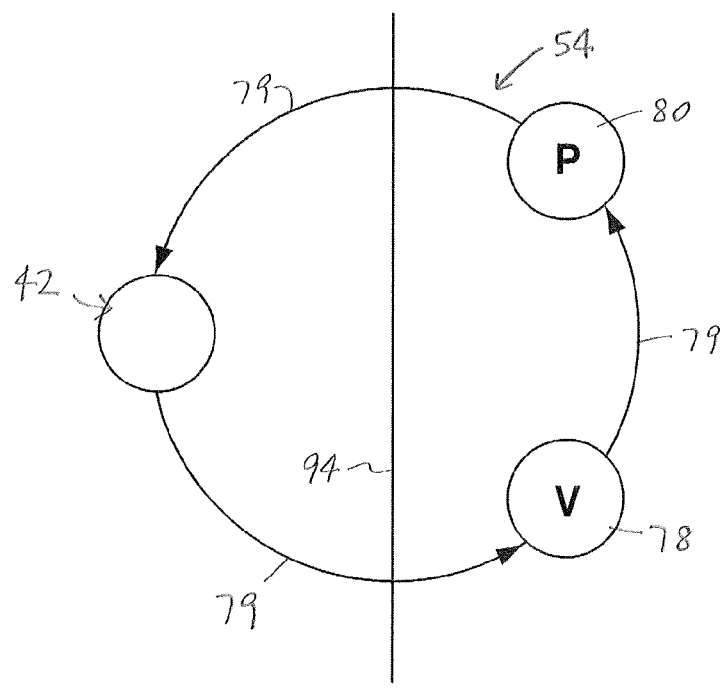
FIG. 2D is a block diagram schematically representing the governor subassembly and a hydraulic circuit in the embodiment of the mixer nozzle assembly of the invention partially illustrated in FIG. 2B.
Figure 3:
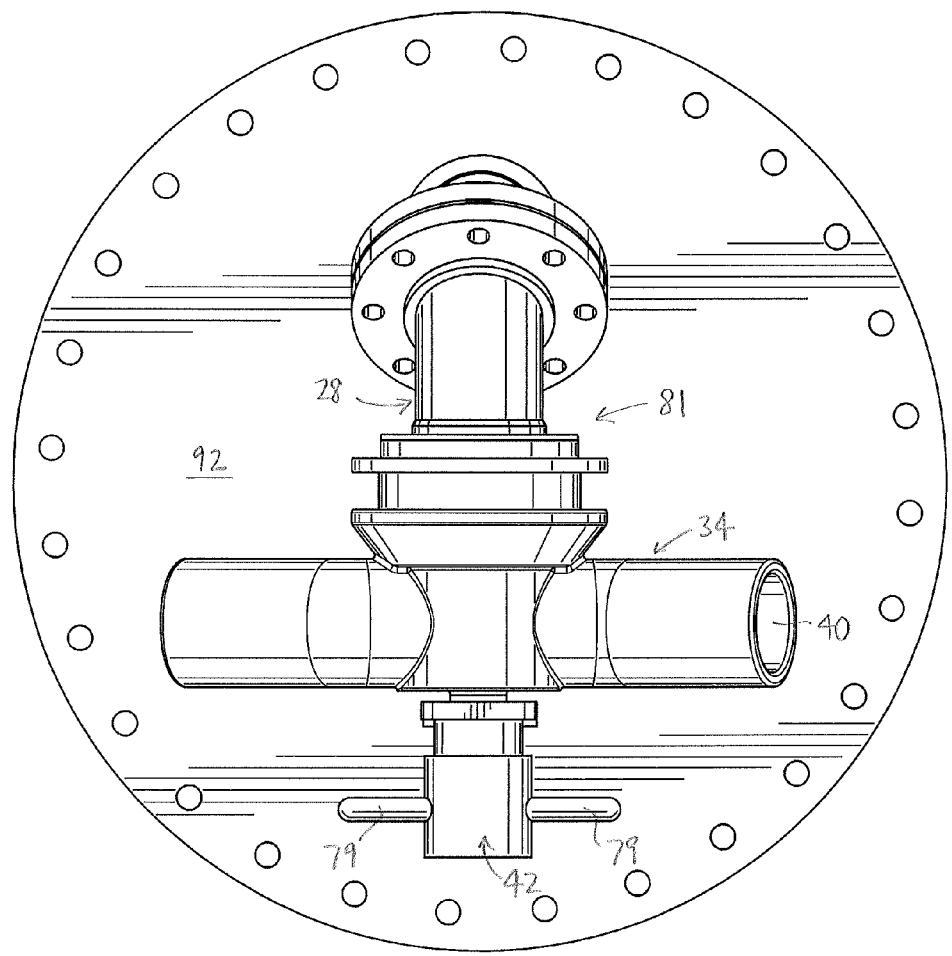
FIG. 3 is a front view of the mixer nozzle assembly of FIG. 1A.

In another embodiment, the hydraulic circuit 54 preferably also includes a pump 80 for controlling the flow of the hydraulic fluid to the internal volume 52, to adjust the speed of rotation of the rotatable body to the preselected speed. As illustrated in FIGS. 2B and 2D, it is also preferred that the pump 80 is located outside the tank 24, for adjustment of the flow rate of the hydraulic fluid. Those skilled in the art will appreciate that the pump 80 may be any suitable pump. As is well known in the art, the pump 80 may be included in a hydraulic power pack, which generally also includes, at a minimum, a motor for powering the pump, and a reservoir. As can be seen in FIGS. 2B and 2D, the tubes or lines 79 connect the governor body and the valve 78 and/or the pump 80 to permit the hydraulic fluid to flow therebetween.

Those skilled in the art will appreciate that, if the pump 80 is included in the hydraulic circuit 54 in the absence of the valve 78, then the flow of the hydraulic fluid through the hydraulic circuit 54 would be substantially determined by the pump 80 when it is operating. (In this situation, the governor subassembly 42, driven by the rotatable body's rotation, may also have an effect on the flow of the hydraulic fluid.) If the flow of the fluid 22 through the rotatable body 34 were substantially constant, then the pump 80 could, if it had the appropriate capacity, be used to pump the hydraulic fluid through the hydraulic circuit 54 so as to cause the rotatable body 34 to rotate at the preselected speed.

However, in many applications, the flow rate of the fluid 22 varies in practice (and other parameters relating to the fluid and affecting the speed of rotation of the rotatable body, e.g., the density of the fluid, may vary), so that it is preferable to be able to adjust the flow rate of the hydraulic fluid to take variations in the product fluid 22 or its flow into account. Depending on the application, however, the valve 78 alone may provide sufficient control of the flow rate of the hydraulic fluid.

In situations where the valve 78 alone is unlikely to provide sufficient variation in the flow of the hydraulic fluid, the pump 80 preferably is also included in the hydraulic circuit 54, as well as the valve 78. It will be appreciated by those skilled in the art that, with the pump 80 and the valve 78, more flexible control of the flow rate of the hydraulic fluid is achievable than with the valve 78 alone. Accordingly, it will be understood that the hydraulic circuit 54 of the invention may include the pump 80 alone for controlling the flow rate, or the valve 78 alone, or both, if preferred, depending on the circumstances in which the mixer nozzle assembly 20 is to operate.

As can be seen, for instance, in FIGS. 1A-2A, certain elements of the mixer nozzle assembly 20 preferably are mounted inside the tank 24. These elements include the stationary body, the rotatable body, the hydraulics governor subassembly, and parts of the hydraulic circuit. Such elements are sometimes referred to herein as "interior elements" (i.e., in-tank elements) for convenience, and are designated by reference numeral 81.

As noted above, in a large storage tank, achieving the desired degree of mixture can be difficult. It will be appreciated by those skilled in the art that the speed of rotation of the rotatable body 34 preferably is maintained within an optimal range of speeds, i.e., the preselected speed may be a particular speed, or may be the optimal range of speeds. The optimal range (i.e., the preselected speed) in any particular situation depends on a number of factors, e.g., the amount of the fluid in the tank volume, and the viscosity of the fluid. For example, if the speed of rotation of the rotatable body 34 is too slow, then insufficient mixing of the fluid in the tank volume, or virtually no mixing, is achieved. Alternatively, if the speed of rotation is too fast, then the mixing effect is localized, i.e., limited to the fluid in the immediate vicinity of the mixer nozzle 20. Accordingly, it can be seen that the speed of rotation of the rotatable body 34 preferably is within the optimal range for the fluid in the tank volume at a particular time.

It will be understood that the amount of the fluid 22 in the tank volume 26 as illustrated in FIG. 1B is exemplary only. Those skilled in the art would be aware that the amount of the fluid 22 in the tank volume 26 varies over time.

It will also be understood that the manner in which the interior elements 81 are mounted in the tank 24 varies. For instance, in one embodiment illustrated in FIG. 1C, the interior elements 81 are mounted to a wall of the tank 24. However, in an alternative embodiment (illustrated in FIGS. 8A and 8B), the interior elements 81 are positioned substantially centrally in the tank volume 26, as will be described.

Because the interior elements 81 of the mixer nozzle assembly 20 are mounted inside the tank 24, they are intended to have an operating life equal to the tank's operating life, e.g., about 20 years. That is, the tank 24 is not designed to permit access to the interior elements 81 of the mixer nozzle assembly 20 for repair or replacement, such elements being those illustrated, for example, in FIGS. 1A, 1C, and 3-5A. Also, and as can be seen in FIG. 1B, in operation the interior elements 81 often are immersed in the fluid in the tank volume, and may be so immersed for long periods of time. Those skilled in the art will appreciate that reliably determining the speed of rotation of the rotatable body 34 is difficult in this situation because conventional electrical or mechanical rotational speed detection devices are unsuitable, due to the lack of access to the stationary body and the rotatable body (and the other internal elements) after the mixer nozzle assembly 20 is mounted on the tank 24, and also due to safety concerns, e.g., the need to avoid immersing electrical devices in petroleum fluid inside the tank 24.

Figure 6A:
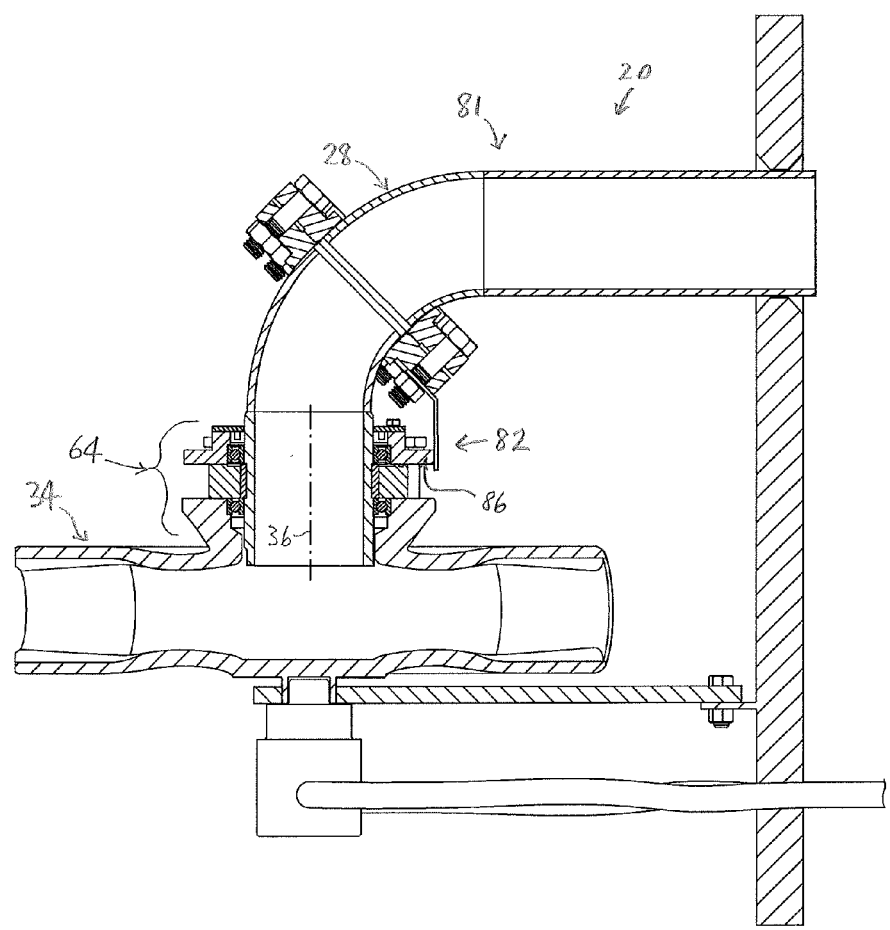
FIG. 6A is a cross-section of an alternative embodiment of the mixer nozzle assembly of the invention, drawn at a smaller scale.
Figure 6B:
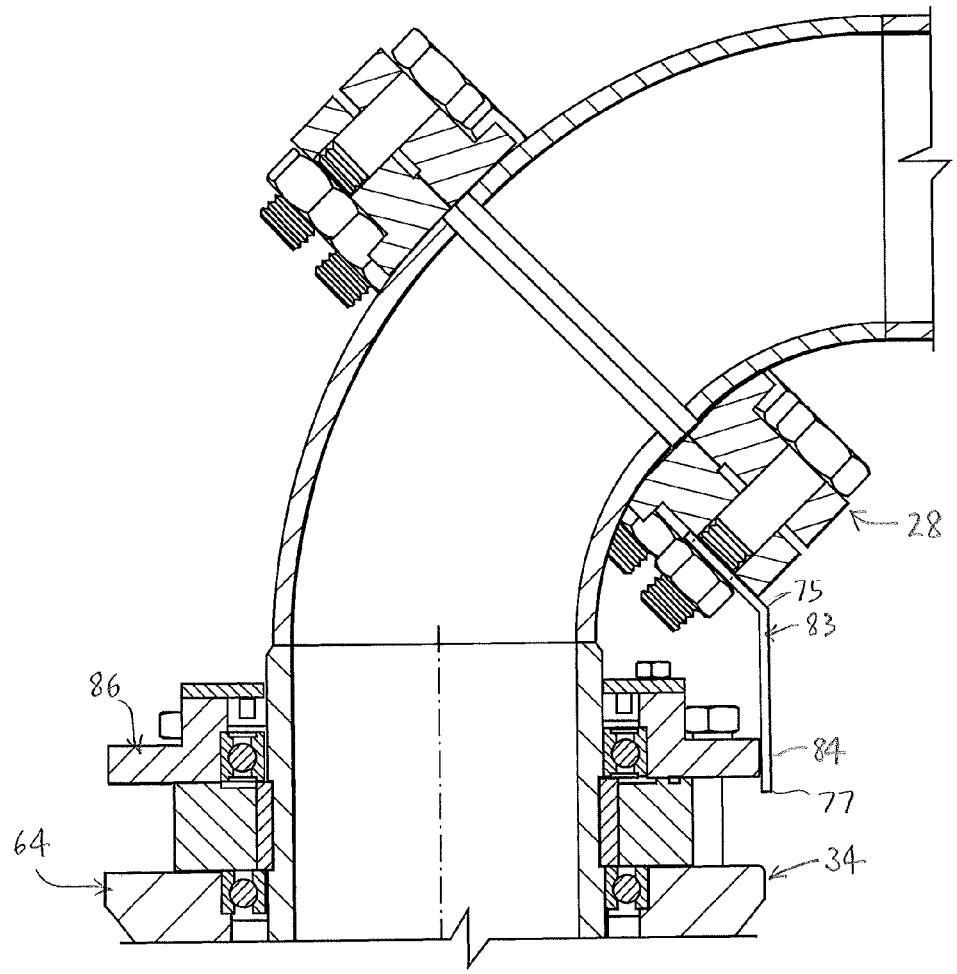
FIG. 6B is a cross-section of a portion of the mixer nozzle assembly of FIG. 6A, drawn at a larger scale.

In one embodiment, the mixer nozzle assembly 20 preferably includes a speed indicator 82 (FIGS. 6A, 6B), for indicating the speed of rotation of the rotatable body 34 about the axis 36 relative to the stationary body 28. As noted above, the speed indicator 82 preferably enables the speed of rotation of the rotatable body 34 to be determined without utilizing electrical components or devices. In one embodiment, the speed indicator 82 preferably includes one or more first elements 83 that are stationary relative to the rotatable body 34. The first element 83 may be made of any suitable material. Because the first element 83 preferably is somewhat flexible (as will be described), it is preferred that the first element 83 is made of spring steel. As can be seen in FIG. 6B, the first element 83 preferably includes a first engagement portion 84.

Also, it is preferred that the speed indicator 82 includes one or more second elements 85 (FIGS. 6C, 6D) mounted on a collar 86 of the rotatable body 34. The collar 86 is part of the mounting portion 64 of the rotatable body 34, i.e., the collar 86 rotates with the mounting portion 64 around the axis of rotation 36. The collar 86 preferably includes a generally circular body edge 87 which is also coaxial with the axis of rotation 36. The second elements 85 preferably are positioned on the body edge 87 and protrude therefrom, so that the second elements 85 rotate around the axis of rotation 36 with the rest of the rotatable body 36, in which the second elements 85 are included. Preferably, each second element 85 includes a second engagement portion 88 (FIG. 6D), for sliding engagement with the first engagement portion 84.

Figure 6C:
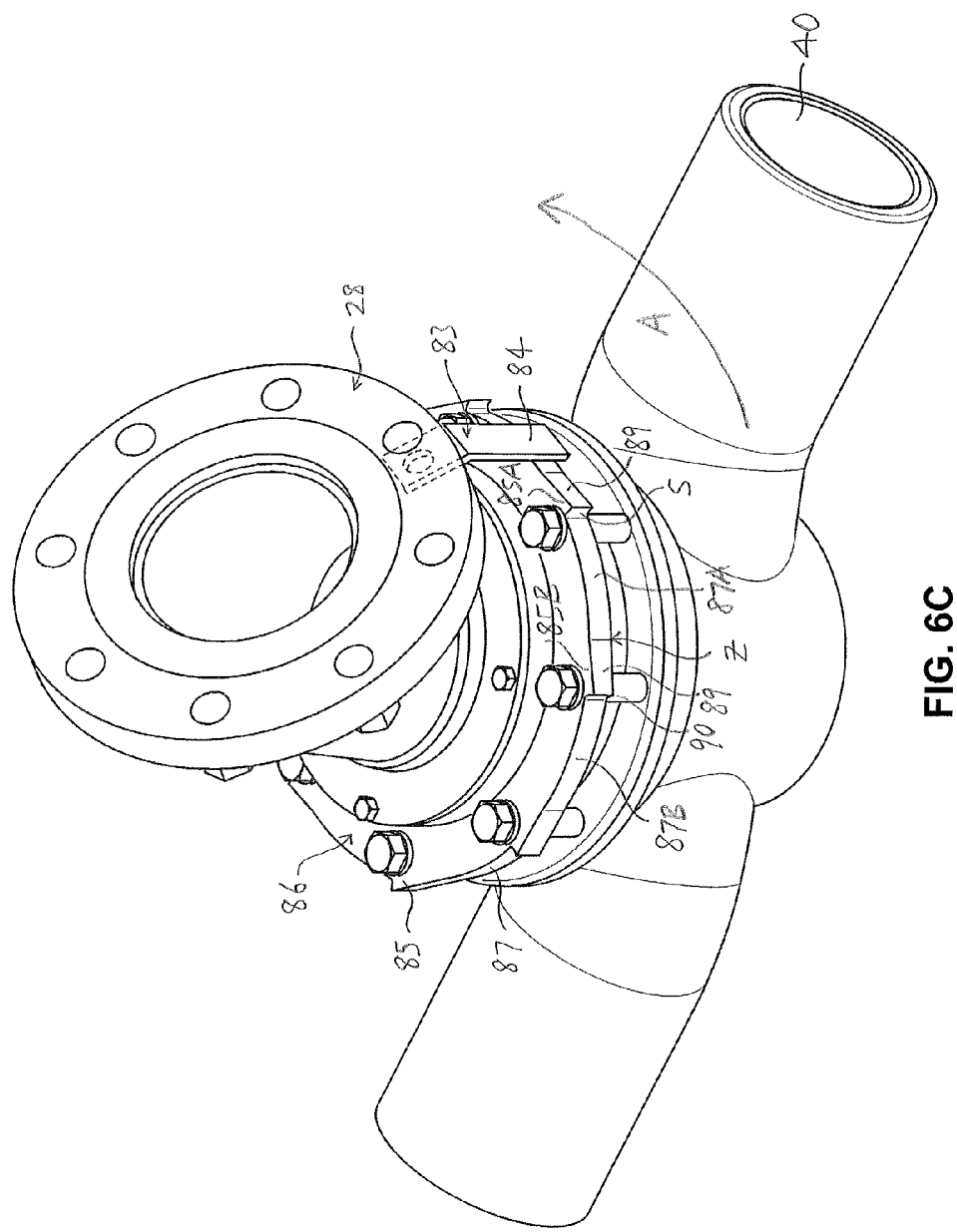
FIG. 6C is an isometric view of a portion of the mixer nozzle assembly of FIG. 6A, drawn at a larger scale.
Figure 6D:
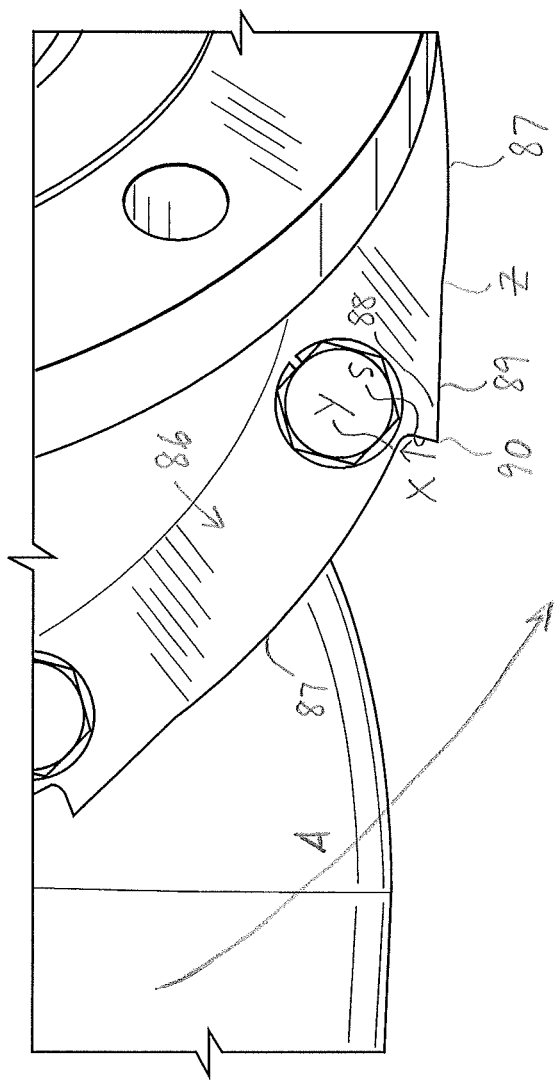
FIG. 6D is an isometric view of a portion of the mixer nozzle assembly of FIG. 6C, drawn at a larger scale.

As can be seen in FIG. 6D, in one embodiment, each second engagement portion 88 preferably includes an engagement surface 89 which diverges outwardly (i.e., away from the axis of rotation) relative to the substantially circular body edge 87. The engagement surface 89 extends between the body edge 87 and an end point 90 (FIG. 6D). The second element 85 also includes a surface "S" (FIG. 6D) located between the end point 90 and the body edge 87 which is positioned to permit the first engagement portion 84 (not shown in FIG. 6D) to move unimpeded from engagement with the engagement surface 89 at the end point 90 to engagement with the body edge 87, as the collar 86 rotates in the predetermined direction (indicated by arrow "A" in FIGS. 6C and 6D).

Also, the engagement surface 89 joins the body edge 87 at a point identified as "Z" in FIG. 6D. It is preferred that the engagement surface 89 and the body edge 87 form a relatively smooth surface at "Z".

In FIG. 6C, the first engagement portion 84 is shown positioned between two second elements identified for convenience as 85A and 85B. (It will be understood that only part of the stationary body 28 is shown in FIG. 6C, for clarity of illustration.) It can be seen in FIGS. 6C and 6D that, as the collar 86 rotates in the predetermined direction, the first engagement portion 84, which is stationary, is slidingly engaged alternately by the body edge 87 and the second engagement portion 88. As illustrated in FIG. 6C, the first engagement portion 84 is slidingly engaged with the body edge 87. In FIG. 6C, the second element identified for convenience as 85A is about to engage the first engagement portion 84. The transition from the body edge 87 to the engagement surface 89, at "Z", preferably is relatively smooth, so that the collar 86 continues to rotate when the engagement surface 89 slidingly engages the first engagement portion 84.

In FIG. 6D, it can be seen that the engagement surface 89 diverges from the body edge 87 outwardly. When the engagement surface 89 of the second element 85A is brought into sliding contact with the first engagement portion 84, the engagement surface 89 pushes the first engagement portion 84 gradually outwardly (i.e., away from the axis of rotation 36) until the first engagement portion 84 clears the end point 90.

In effect, as the engagement surface 89 moves past the first engagement portion 84, the first element 83 is bent further outwardly, that is, it is bent outwardly from its inner end 75 at which it is attached to the stationary body 28 to its outer end 77 (FIG. 6B). It can be seen in FIG. 6D that the first element 83 is bent outwardly progressively further until the end 90 of the engagement surface engages the first engagement portion 84.

As can be seen in FIG. 6D, when the first engagement portion 84 clears the end point 90 of the engagement surface 89, the first engagement portion 84 resiliently moves rapidly in the direction indicated by arrow "X" in FIG. 6D, until the first engagement portion 84 strikes the body edge 87, at the point identified as "Y" in FIG. 6D. When the first engagement portion 84 rapidly strikes the body edge 87 at the point identified as "Y", an audible signal (i.e., a "click", or "snap") is generated.

It will be understood that, after the first element 83 has snapped inwardly to engage the body edge 87, the first engagement portion 84 is slidingly engaged by the body edge 87 as the rotatable body 34 continues to rotate. For example, after the first element 83 clears the end 90 of the engagement surface 89 on the second element 85A, the body edge identified as 87A in FIG. 6C slidingly engages the first engagement portion 84 until the second element 85B engages the first engagement portion 84. Specifically, the engagement surface 89 of the second element 85B slidingly engages the first engagement portion 84, once again causing the first element 83 to bend slightly outwardly from its inner end 75 to its outer end 77. When the first element 83 clears the end 90 of the second element 85B, the first element 83 snaps inwardly rapidly and strikes the body edge identified for convenience as 87B in FIG. 6B. It will be understood that the collar 86 illustrated in FIGS. 6A-6D preferably includes a number of second elements 85 that are spaced substantially equidistant from each other around the body edge 87, so that the second elements 85 serially engage the first element 83 as the rotatable body 34 rotates. It will also be understood, however, that if preferred, the collar 86 could include only one second element 85.

Those skilled in the art will appreciate that the first element 83 preferably is resilient, so that it will consistently bend outwardly when it is engaged by each engagement surface 89, and then snap back when it clears the end 90 of each engagement surface 89, to provide the audible signal when each of the second elements 85 engages the first element 83. Because of this, it is preferred that the first element 83 be made of spring steel or of any other suitably resilient material.

As shown in FIGS. 6C and 6D, each second engagement portion 88 preferably is positioned for engagement with the first engagement portion 84 at time intervals as the rotatable body 34 rotates about the axis 36 relative to the stationary body 28, for providing an audible signal to indicate the speed of rotation of the rotatable body 34 relative to the stationary body 28. From the foregoing, it can be seen that the audible signals will be produced on a substantially consistent basis if the rotatable body 34 is rotating at a consistent speed, enabling the operator to determine, from the audible signals, the actual speed of rotation of the rotatable body 34.

From the foregoing, it can also be seen that the speed indicator 82 is relatively simple in its construction, so that it is unlikely to malfunction. Due to the lack of access to the speed indicator 82 and the interior elements 81 after the interior elements 81 have been mounted in the tank 24, it is important that the speed indicator 82 have a simple and rugged construction which is unlikely to malfunction.

Figure 8A:
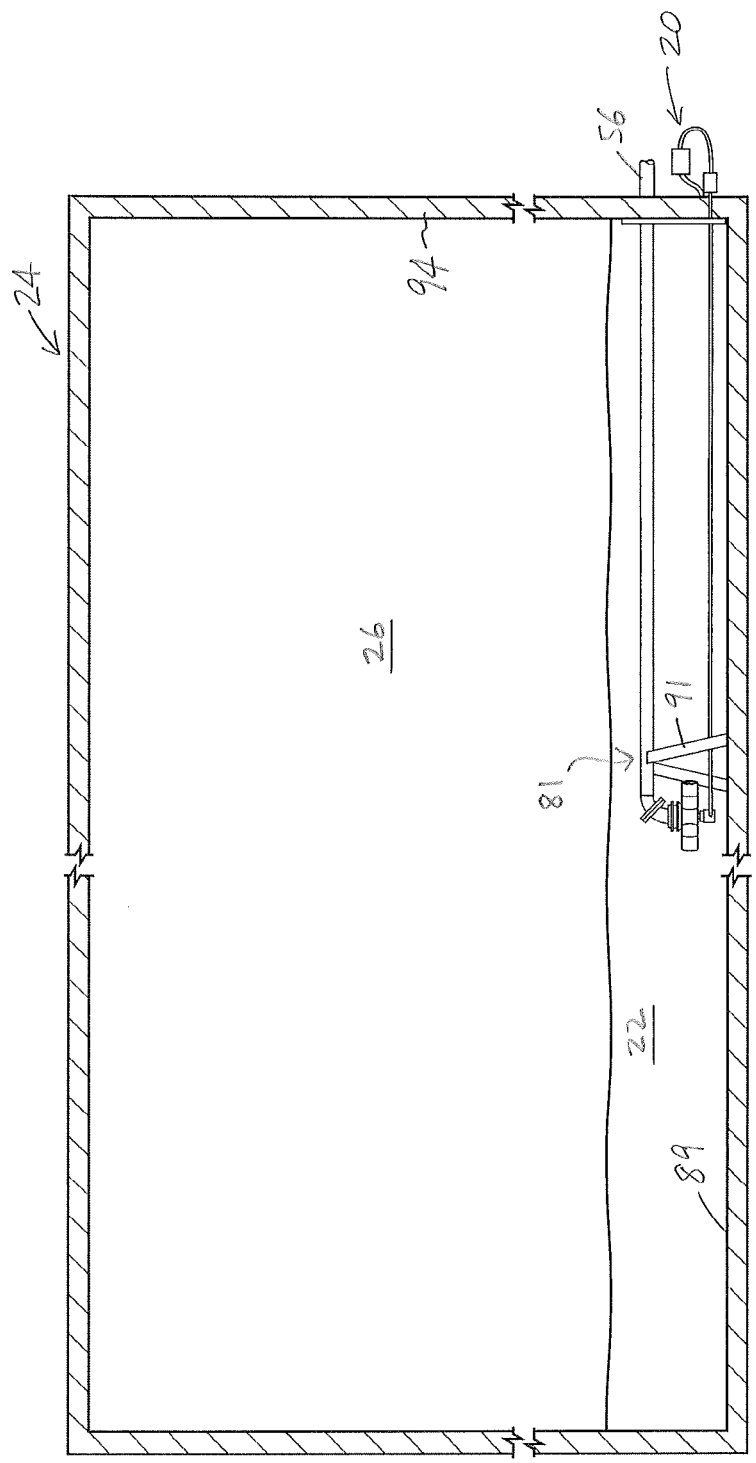
FIG. 8A is a cross-section of a storage tank with elements of an alternative embodiment of a mixer nozzle assembly of the invention mounted therein, drawn at a smaller scale.
Figure 8B:
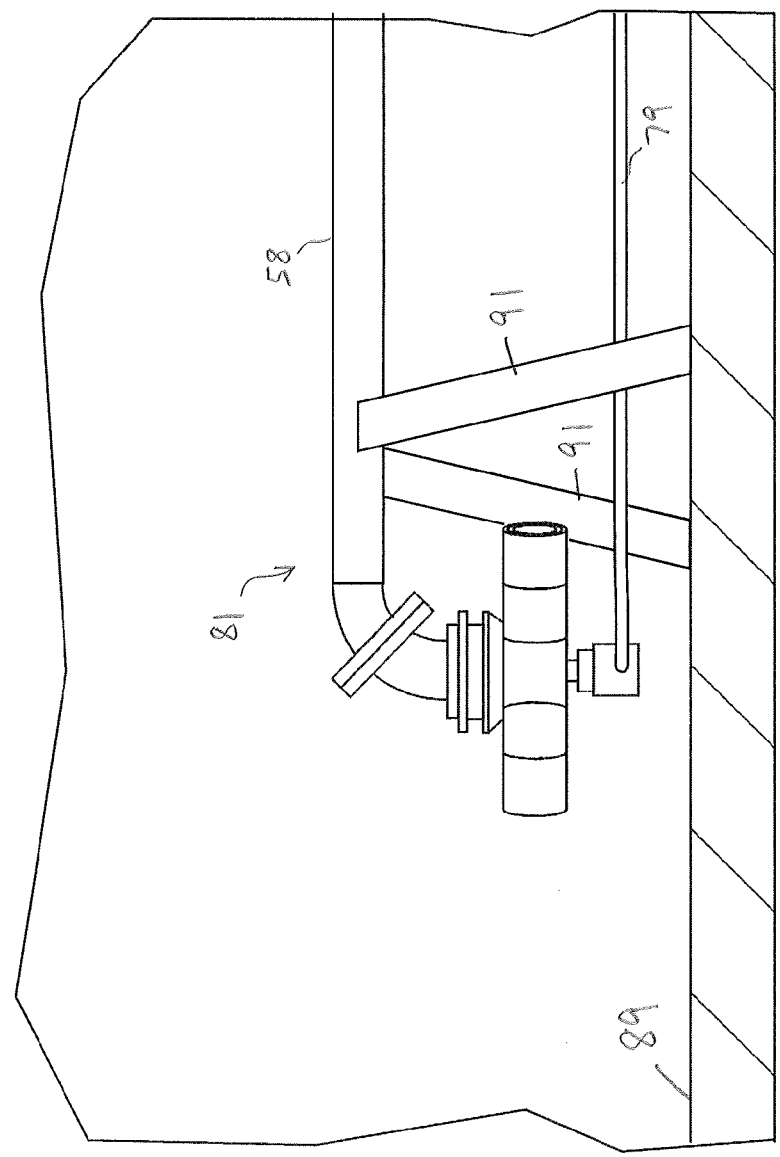
FIG. 8B is a side view of a portion of the mixer nozzle assembly of FIG. 8A, drawn at a larger scale.

As can be seen in FIGS. 8A and 8B, the interior elements 81 may be located substantially centrally inside the tank 24, i.e., positioned substantially centrally on a tank floor 89. In the embodiment of the mixer nozzle assembly 20 shown in FIGS. 8A and 8B, legs or other suitable supports 91 are included, to support the stationary body 28. In this embodiment of the mixer nozzle assembly 20, the first portion 58 of the stationary body 28 and the hydraulic lines 79 that are positioned inside the tank 24 are relatively long. The internal elements 81 may be positioned as illustrated in FIGS. 8A and 8B to provide for more effective mixing of the fluid 22 throughout the entire tank volume 26.

The stationary body 28, the rotatable body 34, and the governor subassembly 42 and other interior elements preferably are constructed of any suitable materials. Those skilled in the art would be aware of materials that would be suitable for use with various fluids. As an example, it has been found that nickel-plated carbon steel is a suitable material for the stationary body 28 and the rotatable body 34 for use with a variety of fluids. Depending on the fluid, these elements may, alternatively, be made of stainless steel.

From the foregoing, it can be seen that in use, the operator can use the mixer nozzle assembly 20 to provide a desired degree of mixing to the fluid, as the fluid is pumped into the tank 24. For instance, in one embodiment of the mixer nozzle assembly 20 according to the invention, the hydraulic circuit 54 preferably includes the valve 78 for controlling the flow rate of the hydraulic fluid to the internal volume, to provide the hydraulic fluid thereto at the preselected flow rate. In addition, the hydraulic circuit 54 preferably also includes the hydraulic pump 80 for additionally controlling the flow rate of the hydraulic fluid to the internal volume, to provide the hydraulic fluid thereto at the preselected flow rate. Also, it is preferred that the mixer nozzle assembly 20 includes the speed indicator 82, for indicating the speed of rotation of the rotatable body 34 about the axis 36, so that the flow rate of the hydraulic fluid is adjustable by the valve 78 and by the hydraulic pump 80 (i.e., by the operator, based on the audible signals provided by the speed indicator) to the preselected flow rate, to adjust the speed of rotation of the rotatable body 34 about the axis 36 to the preselected speed.

As noted above, it is also preferred that the valve 78 and the hydraulic pump 80 are located outside the tank 24, to permit adjustment of the flow rate to the preselected flow rate in response to changes in the speed of rotation of the rotatable body indicated by the speed indicator. That is, when the speed of rotation of the rotatable body changes due to a change in a parameter related to the product fluid or its flow, the preselected flow rate of the hydraulic fluid (i.e., the hydraulic fluid flow rate required to cause the rotatable body to rotate at the preselected speed) changes. Those skilled in the art will appreciate that, because the operator (i.e., positioned outside the tank) can hear the audible signals generated by the speed indicator 82, the operator can adjust the flow rate of the hydraulic fluid accordingly (i.e., via the valve 78 and/or the hydraulic pump 80) to cause the rotatable body 34 to rotate at the preselected speed. For example, where the fluid is Western Canadian blend crude oil (e.g., with a density of about 927 kg/m$^3$) stored in a relatively large storage tank, it has been found that the preselected speed of rotation (i.e., the optimum speed of rotation) is about three revolutions per hour. It will be understood that the preselected speed of rotation will vary depending on a number of factors, e.g., viscosity of the fluid, and the amount of fluid in the tank volume 26.

The mixer nozzle assembly 20 has the advantage that the governor subassembly 42 controls the speed of rotation of the rotatable body 34 by modifying the speed of rotation of the internal element 46, i.e., the rotating movement of the rotatable body 34 is adjusted by modifying the speed of the rotating movement of the internal element 46.

As can be seen in FIG. 1B, the invention also includes the tank 24 with the mixer nozzle assembly 20 mounted thereon, i.e., with the interior elements 81 mounted inside the tank, and parts of the hydraulic circuit positioned outside the tank. In one embodiment, the mixer nozzle assembly 20 includes a base 92 (FIG. 1A). As indicated in FIG. 1B, the base 92 preferably is secured to a tank wall 94 which at least partially defines the tank volume 26. The first portion 58 of the stationary body 28 preferably is connected in any suitable manner to the external pipe 56. As can be seen in FIGS. 2A and 2B, the external pipe 56 is located proximal to an exterior surface 95 of the tank wall 94. Those skilled in the art would be aware of the details of attaching the base 92 to the tank wall 94 and connecting the first portion 58 and the external pipe 56, and it is therefore unnecessary to describe such details further.

It is also preferred that, in one embodiment, the mixer nozzle assembly 20 includes a support element 96 extending between the base 92 and the governor subassembly 42 (FIGS. 4, 5A). The support element 96 preferably is attached to the base 92 and to the governor subassembly 42 in any suitable manner, as would be known to those skilled in the art. The support element 96 is for stabilizing the governor subassembly 42, i.e., for holding the governor body 48 substantially stationary relative to the base 92.

As noted above, in an alternative embodiment, the interior elements 81 may be positioned substantially centrally on the tank floor 89 (FIGS. 8A, 8B). This embodiment of the mixer nozzle assembly 20 preferably includes legs or other supports 91 for supporting the stationary body 28.

Figure 5B:
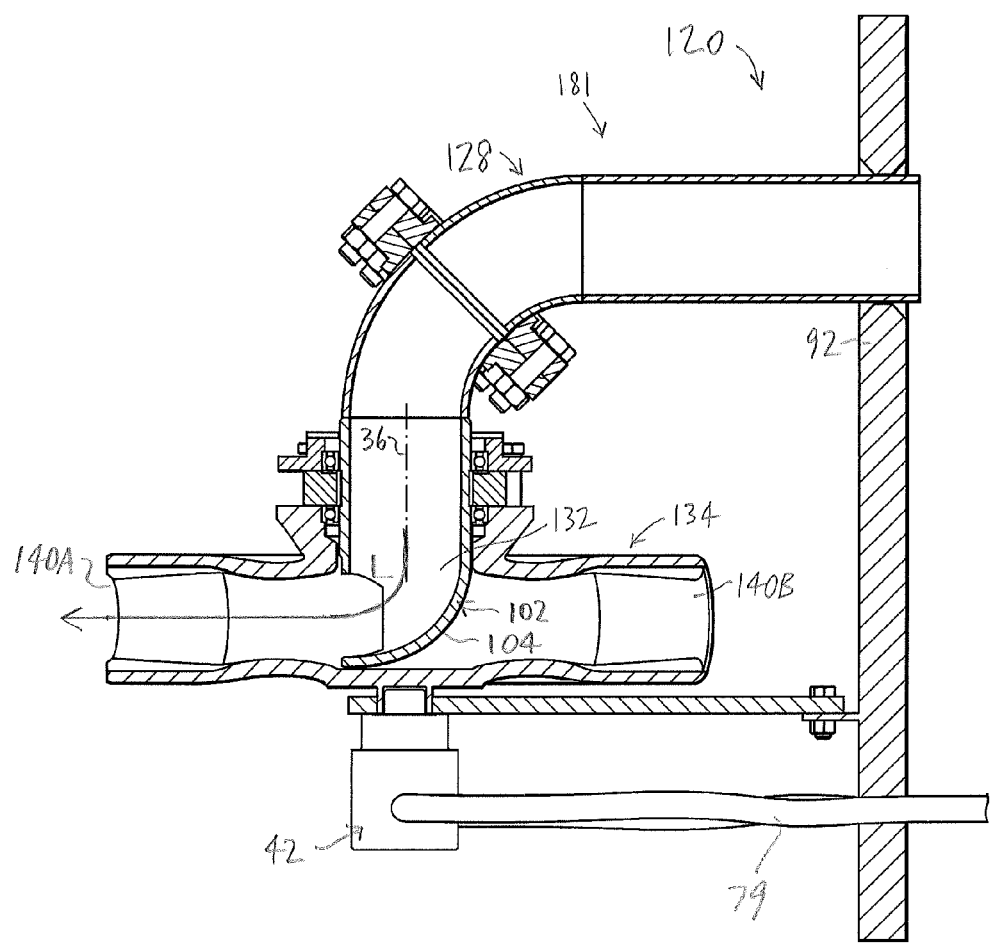
FIG. 5B is a cross-section of an alternative embodiment of the mixer nozzle assembly of the invention.
Figure 5C:
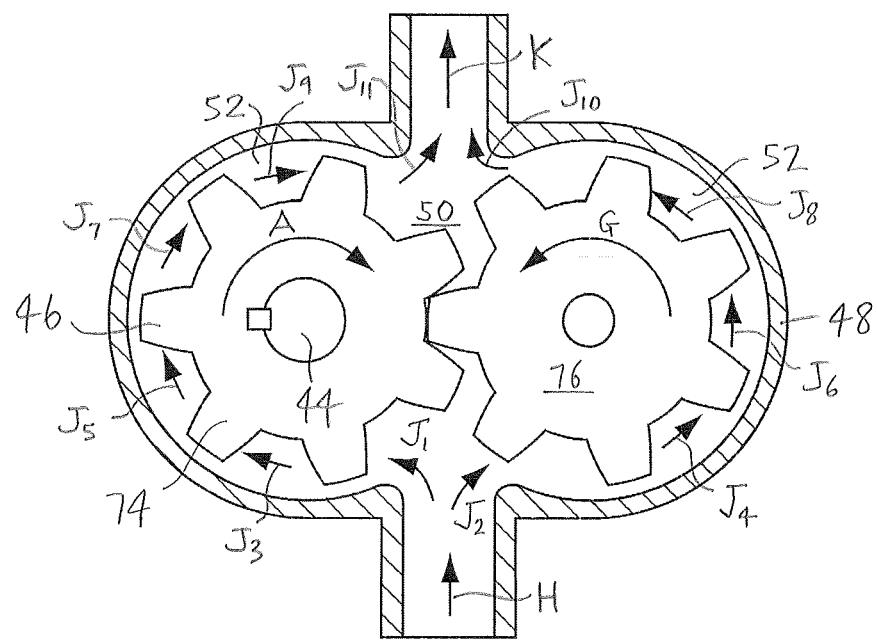
FIG. 5C is a cross-section of an embodiment of the governor subassembly of the invention, drawn at a larger scale.

In an alternative embodiment of a mixer nozzle assembly 120 of the invention, as shown in FIG. 5B, a stationary body 128 thereof preferably includes a deflector 102 positioned at an outlet 132 of the stationary body 128, for directing the fluid 22 exiting the outlet 132 in a preselected direction (indicated by arrow "L" in FIG. 5B) into a rotatable body 134 thereof. The deflector 102 is for directing fluid 22 away from the base 92. As can be seen in FIG. 1B, in one embodiment, interior elements of the mixer nozzle assembly are mounted inside the tank by attaching the base 92 to the tank wall 94. Accordingly, once mounted inside the tank, the rotatable body is located in this arrangement within a relatively short distance of the tank wall 94. This means that a portion of the fluid exiting the rotatable body 34 accomplishes only limited mixing of the fluid already in the tank volume, because the portion is directed against the base plate at relatively close range.

From the foregoing, it can be seen that the mixer nozzle assembly 120 is intended to be used where the interior elements 181 are mounted to the tank wall 94. The advantage of the deflector 102 is that it directs the fluid exiting the stationary body 128 in the preselected direction, i.e., away from the base 92 and the tank wall 94. This results in fluid exiting the rotatable body 134 via only one outlet aperture at a time.

For instance, with the rotatable body 134 positioned as shown in FIG. 5B, it can be seen that the fluid only flows out of the rotatable body 134 via the outlet 140A, and the fluid is blocked from flowing out via the outlet 140B by the deflector 102. As described above, the flow of fluid out of the rotatable body 134 causes the rotatable body 134 to rotate in the predetermined direction. It will be understood that when the rotatable body 134 has rotated a sufficient distance, the outlet aperture 140B will be positioned so that fluid is directed through it by the deflector 102, and fluid will be blocked from flowing through outlet aperture 140A. In this way, the fluid exits the rotatable body 134 via alternating outlet apertures 140A, 140B. Accordingly, where the interior elements are mounted on the tank wall 94, this embodiment of the mixer nozzle assembly 120 results in a more efficient use of the energy expended in pumping the fluid into the tank, as virtually all of the fluid exiting the rotatable body 134 is directed outwardly, away from the tank wall 94.

Those skilled in the art will appreciate that the deflector 102 may have a variety of shapes which would be suitable. As illustrated in FIG. 5B, in one embodiment, the deflector 102 preferably includes a curved portion 104, shaped for guiding the fluid in the preselected direction. It will be understood that much of the hydraulic circuit of the mixer nozzle assembly 120 (i.e., the parts thereof which are to be located outside the tank) is omitted from FIG. 5B for clarity of illustration.

Figure 7:
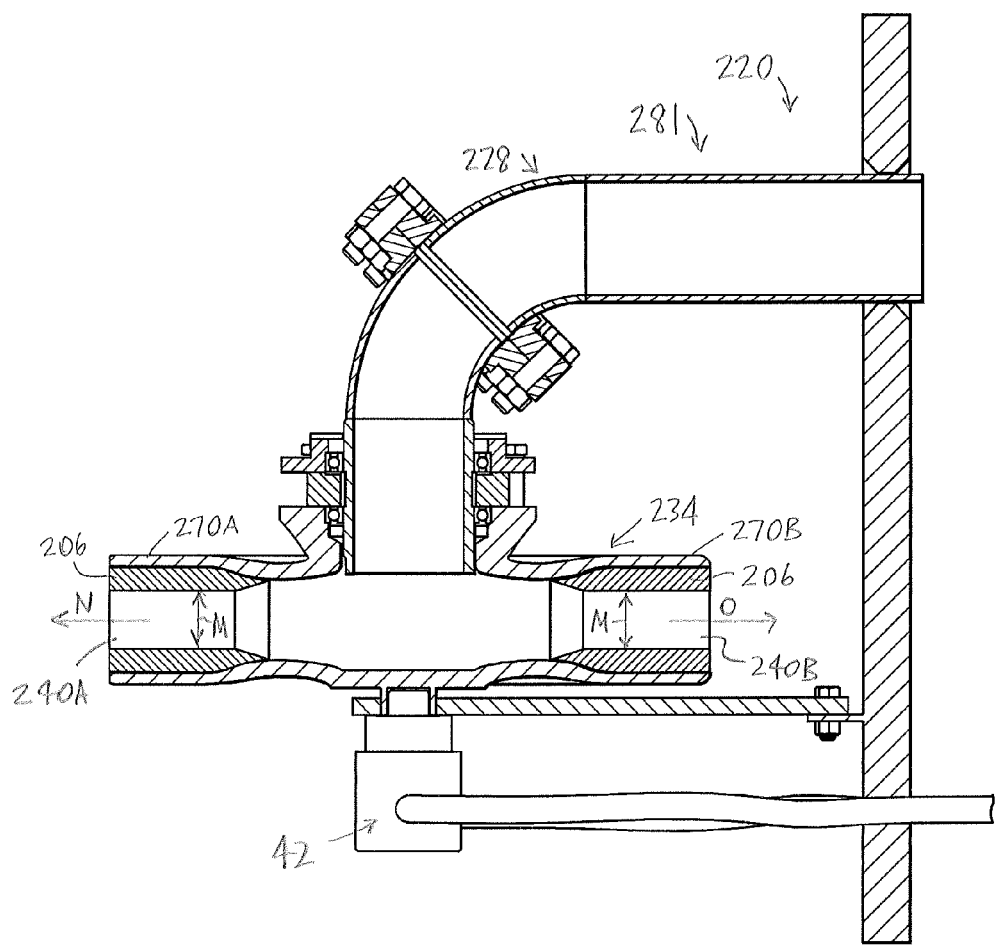
FIG. 7 is a cross-section of another alternative embodiment of the mixer nozzle assembly of the invention, drawn at a smaller scale.

As can be seen, for example, in FIG. 4, in one embodiment, the outlet apertures 40A, 40B are defined by substantially round inner surfaces of the end parts 70A, 70B. Accordingly, the outlet apertures 40A, 40B, as illustrated, have diameters "M". Those skilled in the art will appreciate that the outlet apertures 40A, 40B may have any suitable shape, in order to achieve better mixing. In another alternative embodiment of a mixer nozzle assembly 220 of the invention, a rotatable body 234 thereof preferably also includes one or more inserts 206 attachable to the rotatable body 234 for decreasing the outlet aperture(s) 240A, 240B, to adjust a flow rate of the fluid therethrough. For instance, in circumstances where, due to the prevailing conditions (e.g., viscosity of the fluid), it is thought that the fluid should exit the outlet apertures at a higher velocity in order to achieve mixing to the desired extent, the inserts 206 may be inserted in the end parts 270A, 270B. The inserts 206 define somewhat smaller diameters "M" (i.e., smaller than the diameters of the outlet apertures as shown in FIG. 5A) through which the fluid exits the outlet apertures 240A, 240B, as schematically represented by arrows "N" and "O" respectively. Other interior elements 281 of the mixer nozzle assembly 220 (e.g., the stationary body 228, and the governor subassembly 42) are also illustrated in FIG. 7. It will be understood that much of the hydraulic circuit of the mixer nozzle assembly 220 (i.e., the parts thereof which are to be located outside the tank) is omitted from FIG. 7 for clarity of illustration.

Figure 9A:
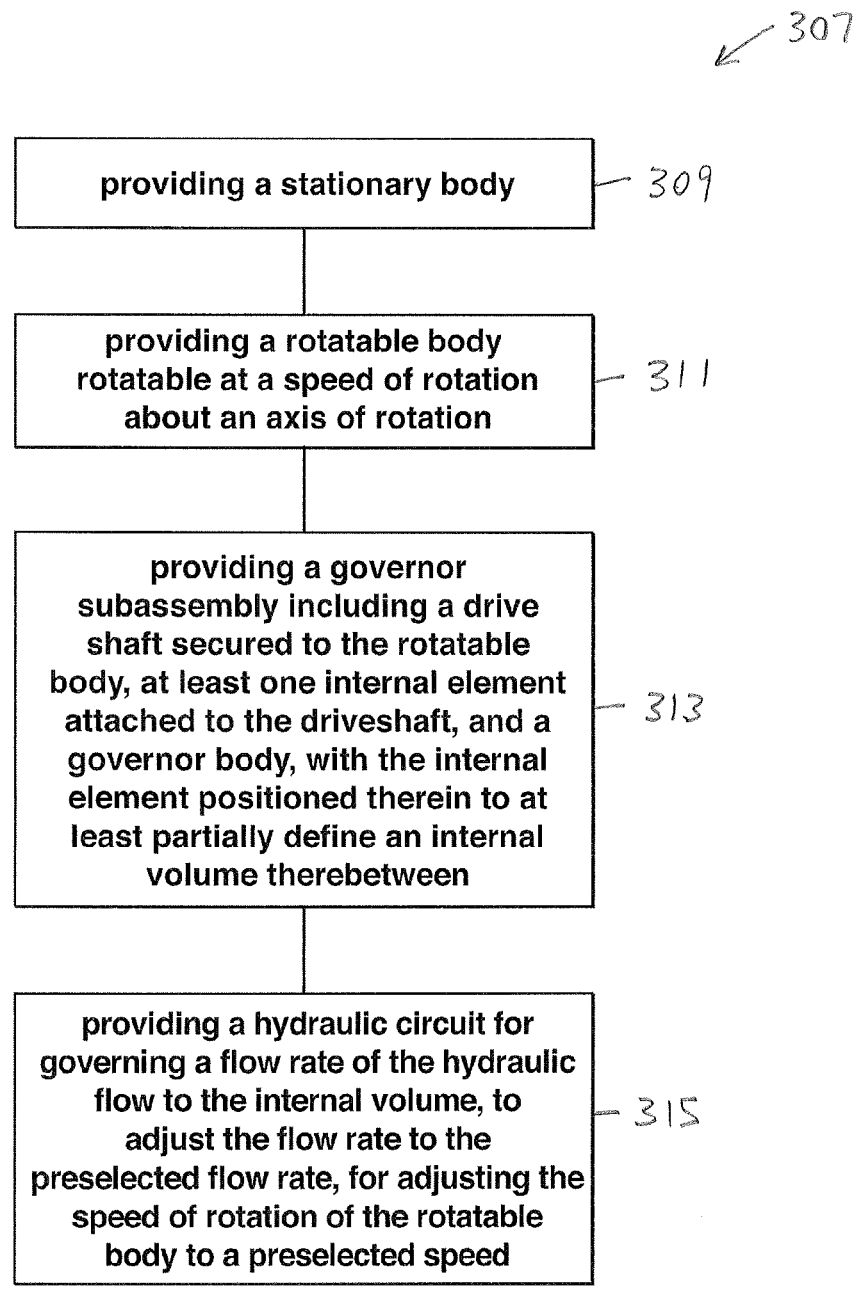
FIG. 9A is a flow chart schematically illustrating an embodiment of a method of the invention.

In use, an embodiment of a method 307 of the invention of mixing the fluid 22 introduced into the tank 24 is illustrated in FIG. 9A through an operational flow chart. In use, the method 307 begins at step 309 in FIG. 9A, in which the stationary body 28 is provided. As schematically illustrated in FIG. 9A, the rotatable body 34 and the governor subassembly 42 are also provided (steps 311, 313 respectively) and the hydraulic circuit 54 is also provided, for adjusting the flow rate of the hydraulic fluid to the preselected flow rate therefor (steps 315).

It will be appreciated by those skilled in the art that, although the steps 309-315 are shown in a particular sequence in FIG. 9A, the sequence of these steps is not functionally significant, i.e. any of the steps could precede any other, it being understood that the elements are connected as described above once they are provided.

Figure 9B:
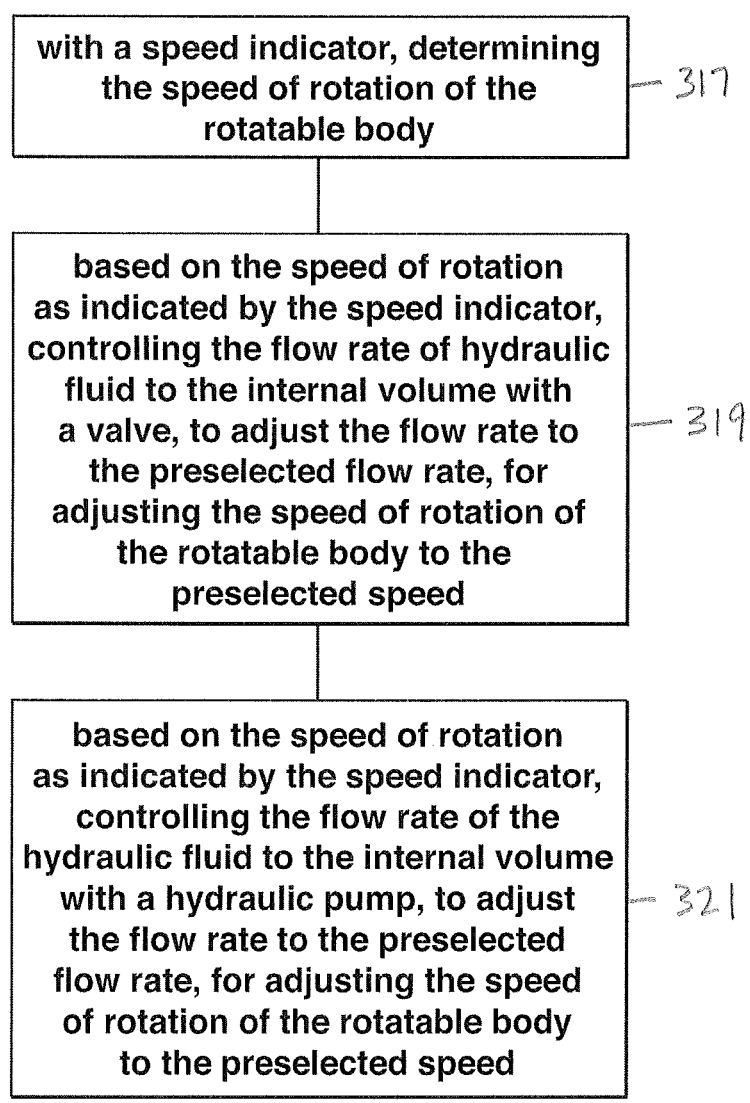
FIG. 9B is a flow chart schematically illustrating an alternative embodiment of the method of the invention.

In one embodiment, and as schematically illustrated in FIG. 9B, the method 307 preferably also includes the step of, with the speed indicator 82, determining the speed of rotation of the rotatable body 34 about the axis of rotation 36 relative to the stationary body 28 (step 317). It is also preferred that the method 307 includes the step of, based on the speed of rotation of the rotatable body, controlling the flow rate of hydraulic fluid to the internal volume with the valve 78, to adjust the flow rate to the preselected flow rate, for adjusting the speed of rotation of the rotatable body 34 to the preselected speed (step 319). In another embodiment, the method 307 includes the step of, based on the speed of rotation of the rotatable body 34, controlling the flow rate of the hydraulic fluid to the internal volume with the hydraulic pump 80, to adjust the flow rate to the preselected flow rate, for adjusting the speed of rotation of the rotatable body 34 to the preselected speed (step 321).

It will be appreciated by those skilled in the art that, although the steps 319 and 321 are shown in a particular sequence in FIG. 9B, these steps are not necessarily function-ally interdependent. For instance, as described above, the speed of rotation may be controlled solely by controlling flow of the hydraulic fluid via the valve 78, or solely by controlling flow of the hydraulic fluid via the pump 80. Alternatively, the flow rate of the hydraulic fluid may be controlled by utilizing both the valve 78 and the pump 80.

It will also be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. A mixer nozzle assembly for mixing fluid introduced into a tank having a tank volume therein, the mixer nozzle assembly comprising:

a stationary body comprising at least one inlet and at least one outlet in fluid communication with each other, said at least one inlet being formed in a first portion of the stationary body, and said at least one outlet being formed in a second portion of the stationary body;

a rotatable body mounted on the stationary body for rotation relative to the stationary body about a rotation axis in a predetermined direction when the fluid flows through the rotatable body, the rotatable body comprising at least one intake aperture and two outlet apertures in fluid communication with each other, said at least one intake aperture being in fluid communication with said at least one outlet of the stationary body for permitting the fluid to flow from said at least one inlet of the stationary body to the outlet apertures, to exit therefrom into the tank volume;

the rotatable body comprising a mounting portion that is mounted on the second portion of the stationary body for rotation about the rotation axis, and a main portion comprising said at least one intake aperture and the outlet apertures;

the outlet apertures being coaxial with respective outlet axes thereof, such outlet axes being offset relative to each other and substantially orthogonal to the rotation axis;

the outlet apertures being formed to permit the fluid flowing into the rotatable body to be split into two substantially equivalent streams thereof flowing through the outlet apertures respectively and coaxial with the outlet axes respectively to cause the rotatable body to rotate about the rotation axis;

the fluid exiting the outlet apertures mixing with at least a part of the fluid in the tank volume;

a governor subassembly for controlling a speed of rotation of the rotatable body in the predetermined direction about the rotation axis, the governor subassembly comprising:

a driveshaft secured to the rotatable body for rotation with the rotatable body about the rotation axis at the speed of rotation;

at least one internal element attached to the driveshaft, for rotation with the driveshaft about the rotation axis at the speed of rotation;

a governor body defining at least one cavity therein in which said at least one internal element is receivable to at least partially define an internal volume between said at least one internal element and the governor body;

the internal volume being adapted to receive hydraulic fluid directable therethrough at a preselected flow rate to moderate rotation of said at least one internal element about the rotation axis, for causing the rotatable body to rotate at a preselected speed; and a hydraulic circuit for governing a flow rate of the hydraulic fluid to adjust the flow rate to the preselected flow rate, for adjusting the speed of rotation of the rotatable body to the preselected speed.

2. A mixer nozzle assembly according to claim 1 in which the hydraulic circuit additionally comprises a valve for controlling the flow rate of the hydraulic fluid to the internal volume, to adjust the speed of rotation of the rotatable body to the preselected speed.

3. A mixer nozzle assembly according to claim 2 in which the valve is located outside the tank, for adjustment of the flow rate of the hydraulic fluid.

4. A mixer nozzle assembly according to claim 1 in which the hydraulic circuit additionally comprises a hydraulic pump for controlling the flow rate of the hydraulic fluid to the internal volume, to adjust the speed of rotation of the rotatable body to the preselected speed.

5. A mixer nozzle assembly according to claim 4 in which the hydraulic pump is located outside the tank, for adjustment of the flow rate of the hydraulic fluid.

6. A mixer nozzle assembly according to claim 1 additionally comprising a speed indicator that provides an audible signal for indicating the speed of rotation of the rotatable body about the rotation axis relative to the stationary body.

7. A mixer nozzle assembly according to claim 6 in which the speed indicator comprises:
at least one first element stationary relative to the rotatable body, said at least one first element comprising a first engagement portion;
at least one second element mounted on the rotatable body, said at least one second element comprising a second engagement portion; and
each said second engagement portion being positioned for engagement with the first engagement portion at time intervals as the rotatable body rotates about the rotation axis relative to the stationary body, for providing the audible signal to indicate the speed of rotation of the rotatable body relative to the stationary body.

8. A mixer nozzle assembly according to claim 7 in which the hydraulic circuit additionally comprises:
a valve for controlling the flow rate of the hydraulic fluid to the internal volume, to provide the hydraulic fluid thereto at the preselected flow rate; and
a hydraulic pump for additionally controlling the flow rate of the hydraulic fluid to the internal volume, to provide the hydraulic fluid thereto at the preselected flow rate, whereby the flow rate is adjustable by the valve and by the hydraulic pump to the preselected flow rate, to adjust the speed of rotation of the rotatable body about the rotation axis to the preselected speed.

9. A mixer nozzle assembly according to claim 8 in which the valve and the hydraulic pump are located outside the tank, to permit adjustment of the preselected flow rate of the hydraulic fluid to the preselected flow rate in response to changes in the speed of rotation of the rotatable body indicated by the speed indicator.

10. A mixer nozzle assembly according to claim 1 in which the stationary body comprises a deflector positioned at said at least one outlet of the stationary body, for directing the fluid exiting said at least one outlet into the rotatable body in a preselected direction relative to the tank.

11. A mixer nozzle assembly according to claim 7 additionally comprising at least one insert attachable to the rotatable body for decreasing a cross-sectional area of at least a selected one of the outlet apertures, to adjust a flow rate of the fluid therethrough, for adjusting the speed of rotation to the preselected speed.

12. A tank for storing fluid therein, comprising:
at least one tank wall, said at least one tank wall at least partially defining a tank volume in which the fluid is receivable;
a mixer nozzle assembly, comprising:
a stationary body comprising at least one inlet and at least one outlet in fluid communication with each other, said at least one inlet being formed in a first portion of the stationary body, and said at least one outlet being formed in a second portion of the stationary body;
a rotatable body mounted on the stationary body for rotation relative to the stationary body about a rotation axis in a predetermined direction when the fluid flows through the rotatable body, the rotatable body comprising at least one intake aperture and two outlet apertures thereof in fluid communication with each other, said at least one intake aperture being in fluid communication with said at least one outlet of the stationary body for permitting the fluid to flow from said at least one inlet of the stationary body to the outlet apertures, to exit therefrom into the tank volume;
the rotatable body comprising a mounting portion that is mounted on the second portion of the stationary body for rotation about the rotation axis, and a main portion comprising said at least one intake aperture and the outlet apertures;
the outlet apertures being coaxial with respective outlet axes thereof, such outlet axes being offset relative to each other and substantially orthogonal to the rotation axis;
the outlet apertures being formed to permit the fluid flowing into the rotatable body to be split into two substantially equivalent streams thereof flowing through the outlet apertures respectively and coaxial with the outlet axes respectively to cause the rotatable body to rotate about the rotation axis;
the fluid exiting the outlet apertures mixing with at least a part of the fluid in the tank volume;
a governor subassembly for controlling a speed of rotation of the rotatable body in the predetermined direction about the rotation axis, the governor subassembly comprising:
a driveshaft secured to the rotatable body for rotation with the rotatable body about the rotation axis at the speed of rotation;
at least one internal element attached to the driveshaft, for rotation with the driveshaft about the rotation axis at the speed of rotation;
a governor body defining at least one cavity therein in which said at least one internal element is receivable to at least partially define an internal volume between said at least one internal element and the governor body;
the internal volume being adapted to receive hydraulic fluid directable therethrough at a preselected flow rate to moderate rotation of said at least one internal element about the rotation axis, for causing the rotatable body to rotate at a preselected speed; and
a hydraulic circuit for governing a flow rate of the hydraulic fluid, to adjust the flow rate to the preselected flow rate, for adjusting the speed of rotation of the rotatable body to the preselected speed.

13. A tank according to claim 12 in which the hydraulic circuit additionally comprises a valve for controlling the flow of the hydraulic fluid to the internal volume, to adjust the speed of rotation of the rotatable body to the preselected speed.

14. A tank according to claim 13 in which the valve is located outside the tank, for adjustment of the flow rate of the hydraulic fluid.

15. A tank according to claim 12 in which:
the mixer nozzle assembly additionally comprises a speed indicator, for indicating the speed of rotation of the rotatable body about the rotation axis, the speed indicator comprising:
   at least one first element stationary relative to the rotatable body, said at least one first element comprising a first engagement portion;
   at least one second element mounted on the rotatable body, said at least one second element comprising a second engagement portion; and
   each said second engagement portion being positioned for engagement with the first engagement portion at time intervals as the rotatable body rotates about the rotation axis relative to the stationary body, for providing an audible signal to indicate the speed of rotation of the rotatable body relative to the stationary body;
the hydraulic circuit additionally comprises:
   a valve for controlling the flow rate of the hydraulic fluid to the internal volume, to provide the hydraulic fluid thereto at the preselected flow rate; and
   a hydraulic pump for additionally controlling the flow rate of the hydraulic fluid to the internal volume, to provide the hydraulic fluid thereto at the preselected flow rate,
whereby the flow rate is adjustable by the valve and by the hydraulic pump to the preselected flow rate, to adjust the speed of rotation of the rotatable body about the rotation axis to the preselected speed.

16. A tank according to claim 15 in which the valve and the hydraulic pump are located outside said at least one tank wall, to permit adjustment of the flow rate of the hydraulic fluid to the preselected flow rate in response to changes in the speed of rotation of the rotatable body indicated by the speed indicator.

* * * * *